US012752475B2

(12) United States Patent
Tabanelli et al.

(10) Patent No.: US 12,752,475 B2
(45) Date of Patent: Oct. 6, 2026

(54) METHOD AND MACHINE FOR BELLING PVC-O PIPES

(71) Applicant: SICA S.P.A., Alfonsine (IT)

(72) Inventors: Giorgio Tabanelli, Cotignola (IT); Giovanni Vecchi, Alfonsine (IT)

(73) Assignee: SICA S.P.A., Alfonsine (IT)

( * ) Notice: Subject to any disclaimer, the term of this patent is extended or adjusted under 35 U.S.C. 154(b) by 55 days.

(21) Appl. No.: 18/554,374

(22) PCT Filed: Apr. 6, 2022

(86) PCT No.: PCT/IB2022/053198
§ 371 (c)(1),
(2) Date: Oct. 6, 2023

(87) PCT Pub. No.: WO2022/214986
PCT Pub. Date: Oct. 13, 2022

(65) Prior Publication Data
US 2024/0123675 A1 Apr. 18, 2024

(30) Foreign Application Priority Data
Apr. 7, 2021 (IT) ........................ 102021000008630

(51) Int. Cl.
*B29C 57/04* (2006.01)
*B29C 33/02* (2006.01)
(Continued)

(52) U.S. Cl.
CPC .............. *B29C 57/04* (2013.01); *B29C 33/02* (2013.01); *B29C 2037/90* (2013.01); *B29L 2023/22* (2013.01)

(58) Field of Classification Search
CPC ...... B29C 57/04; B29C 33/02; B29L 2023/22
See application file for complete search history.

(56) References Cited

U.S. PATENT DOCUMENTS 3,779,446 A 12/1973 Lemelson
4,113,813 A 9/1978 Wilson
(Continued)

FOREIGN PATENT DOCUMENTS

CN 109466054 A 3/2019
CN 111002571 A 4/2020
(Continued)

OTHER PUBLICATIONS

Giorgio Tabanelli—U.S. Appl. No. 18/553,964, filed Oct. 4, 2023.
(Continued)

*Primary Examiner* — Yunju Kim
(74) *Attorney, Agent, or Firm* — SHUTTLEWORTH & INGERSOLL, PLC; Timothy J. Klima

(57) ABSTRACT

A method for processing pipes made of thermoplastic material of the PVC-O type, including the following steps:
- a step of feeding pipes into a station for receiving the pipe;
- a step of heating a first end portion of the pipe, in a heating station;
- a step of belling the first end portion of the pipe, after the step of heating the first end portion of the pipe; and
- a step of making an inner taper at a first end portion of the pipe, in a tapering station, said inner taper being performed before the heating step.

14 Claims, 21 Drawing Sheets

(51) Int. Cl.
*B29C 37/00* (2006.01)
*B29L 23/00* (2006.01)

(56) References Cited

U.S. PATENT DOCUMENTS

| | | | | |
|---|---|---|---|---|
| 4,279,853 | A | 7/1981 | Ohta | |
| 6,383,435 | B2 * | 5/2002 | Savioli | B29C 33/06 264/296 |
| 9,710,942 | B2 | 7/2017 | Kaiami | |
| 9,733,739 | B1 | 8/2017 | Yates | |
| 9,942,279 | B1 | 4/2018 | Prasad | |
| 2001/0005064 | A1 | 6/2001 | Savioli | |
| 2009/0200705 | A1 | 8/2009 | Mora | |
| 2015/0017276 | A1 | 1/2015 | Hayes, Jr. | |
| 2019/0195409 | A1 | 6/2019 | Corbett, Jr. | |
| 2019/0331274 | A1 | 10/2019 | Quesada | |

FOREIGN PATENT DOCUMENTS

| | | | |
|---|---|---|---|
| CN | 212602857 | U | 2/2021 |
| EP | 0930148 | A1 | 7/1999 |
| EP | 2103415 | A1 | 9/2009 |
| EP | 2368693 | A1 | 3/2010 |
| EP | 2614952 | A2 | 7/2013 |
| IT | 01305981 | B1 | 7/1999 |
| WO | 9710942 | A1 | 3/1997 |
| WO | 9733739 | A1 | 9/1997 |
| WO | 9942279 | A1 | 8/1999 |
| WO | 2009074999 | A2 | 6/2009 |

OTHER PUBLICATIONS

Giorgio Tabanelli—U.S. Appl. No. 18/554,374, filed Oct. 6, 2023.
International Search Report dated May 23, 2022 from counterpart PCT App No. PCT/IB2022/053198.
International Search Report dated Oct. 13, 2022 from related PCT App No. PCT/IB2022/053191.
Australian Office Action dated Aug. 29, 2025 from counterpart Australian App No. 2022253587.
Chinese Office Action dated Nov. 13, 2025 from related Chinese App No. 202280024359.5.
Chinese Office Action dated Jan. 10, 2026 from application No. 202280024361.2.

* cited by examiner

METHOD AND MACHINE FOR BELLING PVC-O PIPES

TECHNICAL FIELD

This invention relates to a method and a machine for belling PVC-O pipes.

BACKGROUND ART

Starting from the end of the 1990's processes have been developed for the industrial production of solid wall pipes made of non-plasticised polyvinyl chloride, known as biaxially oriented PVC or PVC-O.

PVC-O pipes are produced by means of a process which allows the orientation of the long molecular chains of PVC obtained from the pipe extrusion process. The orientation in the longitudinal and circumferential directions allows the improvement of the physical properties of the PVC.

The orientation is obtained by increasing the temperature to a value greater than the vitreous transition temperature Tg of the PVC (75° C.-80° C.), then a large force is applied, both in an axial direction and in a circumferential direction, so as to increase the diameter of the pipe and reduce its wall thickness.

Compared with the production process by extrusion of unplasticized polyvinyl chloride (PVC-U) pipes, the process for the production of PVC-O pipes is much more complex and onerous.

The PVC-O material compared with PVC-U has a high tensile strength, fatigue resistance and impact resistance so, despite the higher production costs compared with PVC-U, the PVC-O pipes, in certain sectors of application, have significant advantages with respect to PVC-U pipes. For example, in the technical sector of pipes for supplying fluids under pressure, relative to the well know PVC-U pipes, the PVC-O pipes are applicable up to operating pressures of 25 bar; it should be noted that normally the PVC-U pipes do not exceed operating pressures of 16 bar.

Also for systems of conduits with pressures of less than 25 bar, at least up to operating pressures of 12.5 bar, the PVC-O pipes, compared with PVC-U pipes, have important advantages.

In fact, under equal operating pressure, the PVC-O pipes have a smaller wall thickness; consequently, they are lighter pipes, characterised by a greater transit section, that is to say, a greater flow rate capacity.

As in PVC-U pipes, in PVC-O pipes the shape of joint between the pipes, which is consolidated and by far the most widespread, is that of the bell integrated with the pipe, that is to say, the enlarged shape of the end of the pipe in which the end of another pipe is inserted to form a conduit.

Normally, the bell has in its wide shape a seat in which is housed a gasket made of elastomeric material which guarantees the hermetic seal of the bell joint.

A system for forming the bell is the so-called Rieber system. In the Rieber system the bell is made with the gasket blocked and integral with the wall of the bell, in such a way that it is irremovable and cannot be replaced.

The Rieber system comprises forming the bell by means of a metal pad on which the gasket is installed beforehand in a lowered zone.

During shaping of the bell, the gasket remains applied and integral with the wall of the bell, the pad is then extracted from the bell with the final result of a pipe with an integrated bell complete with non-removable gasket.

Unlike PVC-O pipes, in PVC-U pipes the means which render the gasket integral with the wall of the bell is an internal negative pressure action and/or an overpressure action on the outer surface of the bell (for example with pressurised fluid such as, for example, compressed air).

In PVC-O pipes, according to the Rieber system, the action which shapes the bell, and the relative seat of the gasket, is the spontaneous contraction of the molecules oriented on the forming pad and on the gasket. This contraction occurs when the PVC-O material is in a thermal state greater than the vitreous transition temperature Tg of the PVC.

In effect, at temperatures higher than the temperature Tg, the structure of the molecules of PVC releases the large forces which are applied during the process for producing the pipe for achieving the axial and circumferential orientation of the pipe.

The currently known methods for belling PVC-O pipes with the Rieber system, as described and illustrated in the prior art documents WO97/33739, WO99/42279, WO97/10942, EP0930148, EP2614952 and IT0130598, have several drawbacks.

A drawback found in the prior art methods is the irreversible collapse of the gasket during insertion of the pipe in the gasket housed on the pad.

The forces induced by the end of the pipe when, during belling, it strikes the gasket, held by a contact flange, results in a considerable deformation of the gasket, which being mainly made of elastomeric material is easily deformable, until adversely affecting the structural condition of the gasket.

The pipe having a flat front end, perpendicular to the axis of the pad, impacts the gasket on an edge, with contact surface between the front of the pipe and the gasket decidedly small, generating a contact pressure on the gasket, which is the cause of deformation as well as its subsequent breakage.

Another drawback, due to the high axial compression of the wall of the pipe during the entire step of inserting the pipe in the gasket, is the cancellation or the reduction of the degree of axial orientation of the material in the bell, until, in use, the capacity of resistance to the hydrostatic pressure induced by the fluid circulating in the conduit is adversely affected.

This drawback relates to the resistance generated by the shape of the gasket which protrudes from the cylindrical pad, as well as the friction resistance created by the surface of the elastomeric gasket, which are resistances that are much greater than those induced by the shape and surface of the metal pad. In addition, these resistance effects, caused by the presence of the gasket, are accentuated with the gradual alteration of the shape of the gasket when the wall of the pipe strikes and surmounts the gasket.

DISCLOSURE OF THE INVENTION

In this context, the need has been felt for a method and a machine for belling pipes made of PVC-O, which avoids the deformation of the gasket during belling, as described in the respective independent claims.

BRIEF DESCRIPTION OF DRAWINGS

The technical characteristics of the invention are clearly described in the claims below and its advantages are apparent from the detailed description which follows, with reference to the accompanying drawings which illustrate a preferred embodiment of the invention provided merely by way of example without restricting the scope of the inventive concept, and in which:

DETAILED DESCRIPTION OF PREFERRED EMBODIMENTS OF THE INVENTION

Figure 2A:
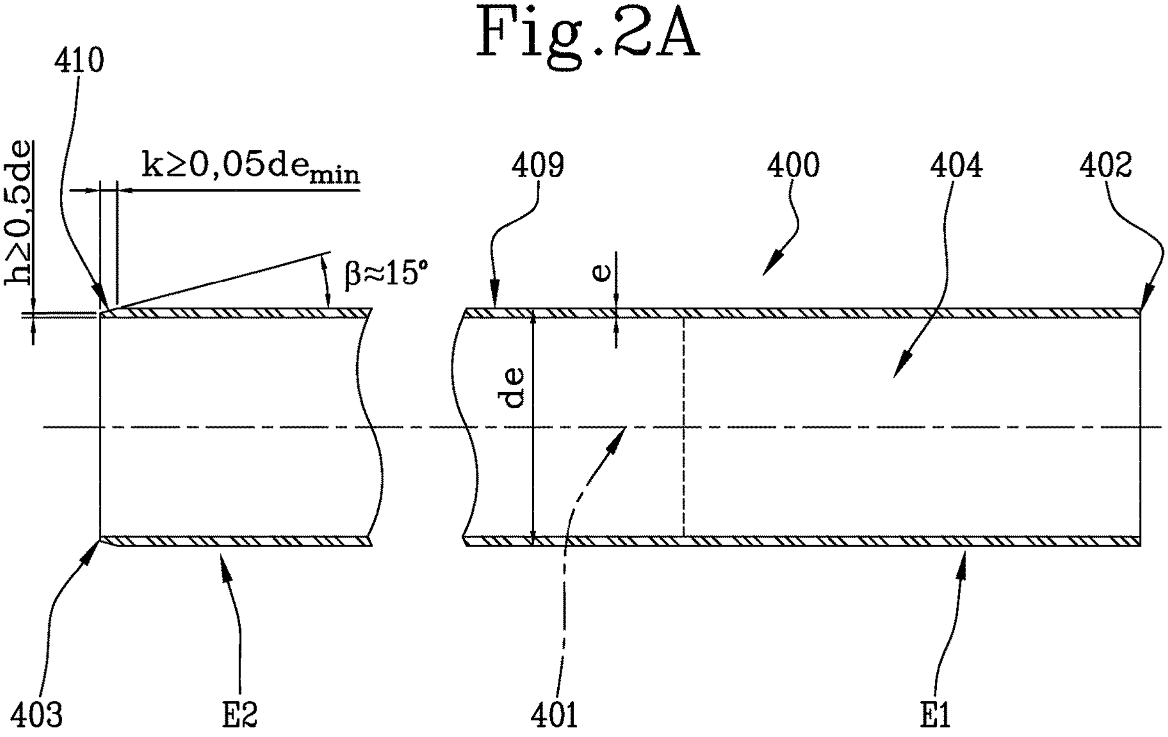
FIG. 2A illustrates a thermoplastic pipe made of PVC-O to be processed using a belling machine according to the invention.

With reference to FIG. 2A, the numeral 400 denotes a pipe made of thermoplastic material of the PVC-O type to be processed in a machine and by a method according to the invention.

The pipe 400 has an axis of symmetry 401.

The pipe 400 has a main longitudinal extension in a direction parallel to the axis of symmetry 401 from a first end 402 to a second end 403.

The first end 402 and the second end 403 are defined, respectively, by the edge of the pipe 400.

The pipe 400 has two end portions E1 and E2, each end portion is positioned at a respective first end 402 and second end 403.

The pipe 400 has an outer surface 409 extending about the axis of symmetry 401.

The pipe 400 has an annular cross section.

The pipe 400 has an inner chamber 404 passing from the first end 402 to the second end 403.

The pipe 400 has a nominal diameter value "dn" and a nominal wall thickness value "en".

The actual value of the outside diameter at any point of the pipe 400 is labelled "de".

The actual value of the wall thickness at any point of the pipe 400 is labelled "e".

At the second end 403, the outer surface 409 of the pipe 400 has a chamfer 410 having an inclination relative to a direction parallel to the axis of symmetry 401 equal to an acute angle β, in particular the value of the angle is between 10° and 25°, inclusive, more specifically the value of the angle β is equal to 15°.

The chamfer 410 is characterised by a longitudinal extension "k", with reference to a direction parallel to the axis 401 of symmetry, and by a transversal extension "h" of the first end 402, along a direction at right angles to the direction of the axis 401 of symmetry.

The first end 402 of the pipe 400 is not touched by the chamfer 410.

Preferably, the longitudinal extension value "k" of the chamfer 410 is correlated with the real minimum external diameter of the pipe 400, called "$de_{min}$", according to the following relation: $k \geq 0.05\ de_{min}$.

Preferably, the transversal extension value "h" of the second end 403 is correlated with the real value of wall thickness measured at the second end of the pipe 403 according to the following relation: $h \geq 0.5e$.

Figure 2B:
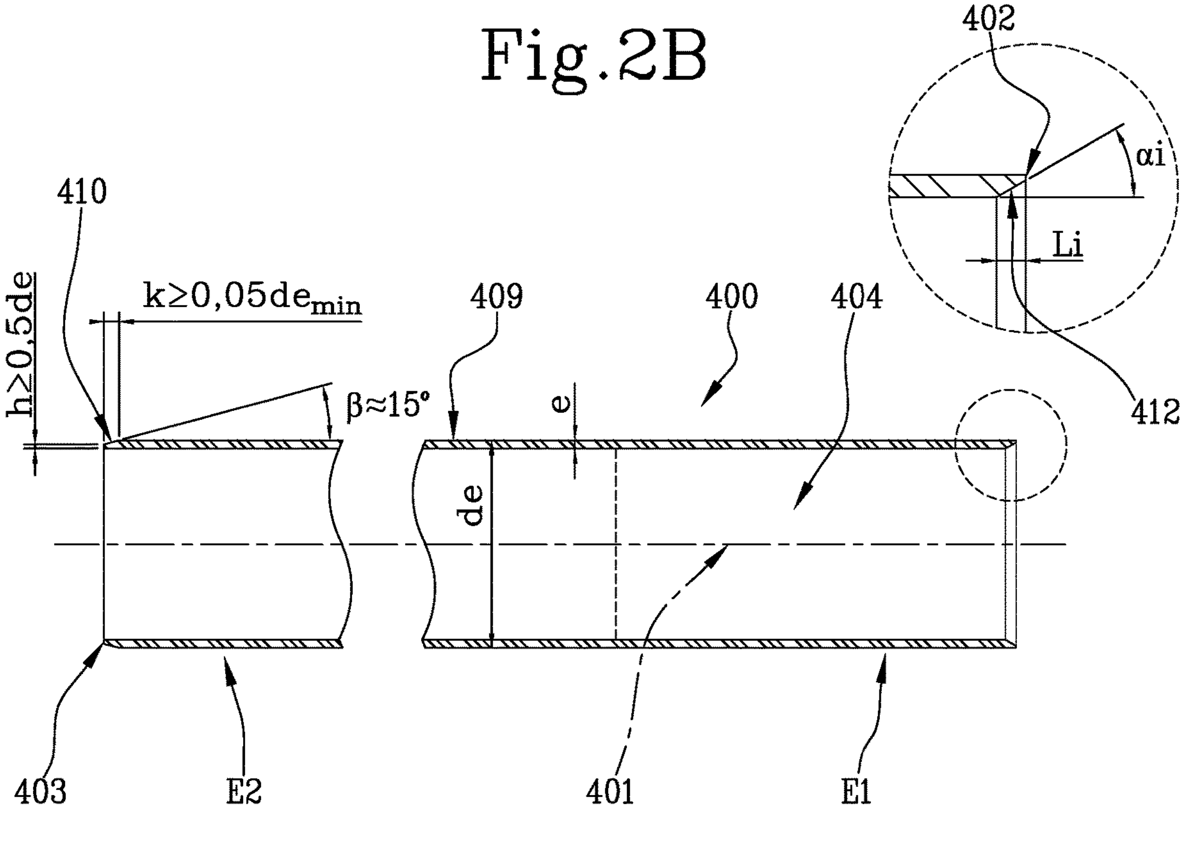
FIGS. 2B and 34 illustrate a PVC-O thermoplastic pipe at the end of the processing performed in a tapering station of the belling machine according to the invention.

With reference to FIG. 2B, the numeral 400 denotes a pipe made of thermoplastic material of the PVC-O type, processed in the machine and with the method according to the invention, in the state at the end of the processing step performed in the tapering station SV.

All the features described above with reference to FIG. 2A remain unchanged in the pipe, with the exception of an inner taper 412 made at the first end 402 of the pipe 400.

The taper 412 has an inclination equal to an acute angle "cd", or initial acute angle, and a longitudinal extension equal to "Li", or initial longitudinal extension.

The value of the angle "cd" of the extension "Li" will be defined below.

Figure 2C:
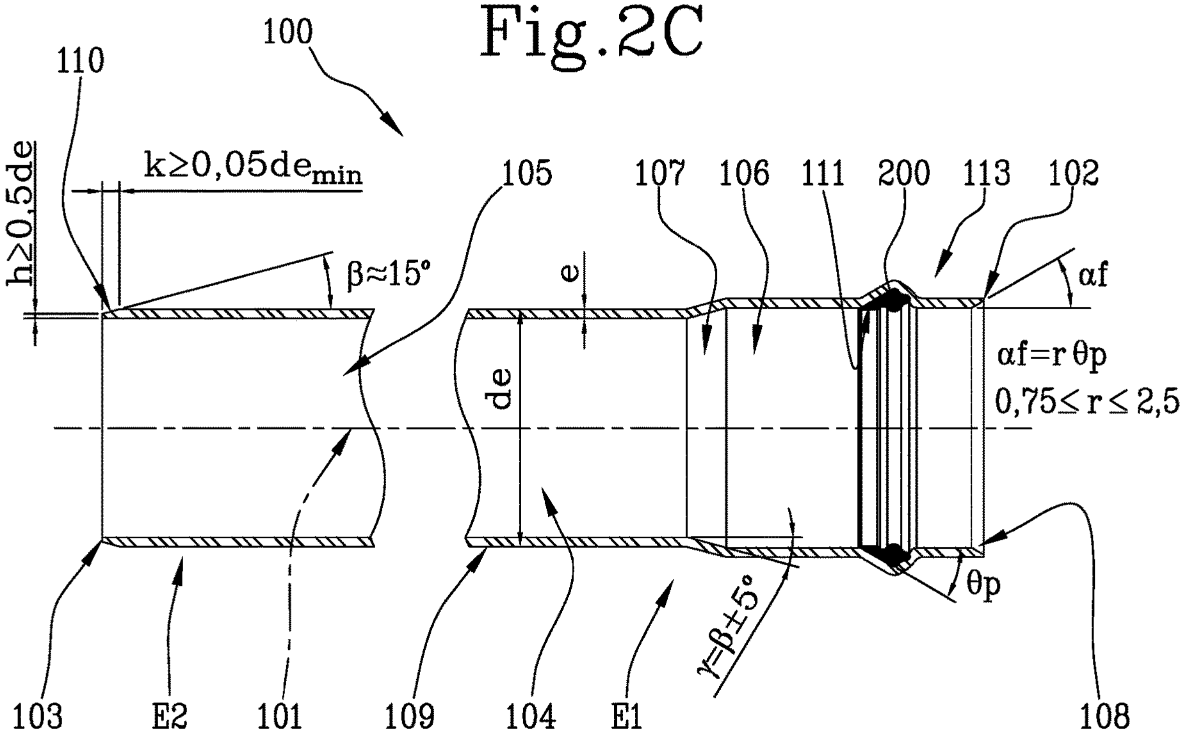
FIGS. 2C and 36 illustrate a thermoplastic pipe made of PVC-O having a bell-shaped end made according to the belling machine and the method according to the invention.

With reference to FIG. 2C, the numeral 100 denotes a pipe made of thermoplastic material of the PVC-O type according to the invention.

The pipe 100 of FIG. 2C constitutes, to all intents and purposes, the finished pipe, according to the invention.

The pipe 100 has an axis of symmetry 101.

The pipe 100 has a main longitudinal extension in a direction parallel to the axis of symmetry 101 from a first end 102 to a second end 103.

It should be noted that the ends 102 and 103 of the pipe 100 correspond to the ends 402 and 403 of the pipe 400 during the previous processing steps.

The first end 102 and the second end 103 are defined, respectively, by the edge of the pipe 100.

The pipe 100 has two end portions E1 and E2, each end portion E1 and E2 is positioned at a respective first end 102 and second end 103.

The pipe 100 has an outer surface 109 extending about the axis of symmetry 101.

The pipe 100 has an annular cross section.

At the second end 103, the outer surface 109 of the pipe 100 has a chamfer 110 having an inclination relative to a direction parallel to the axis of symmetry 101 equal to an acute angle β, in particular the value of the angle is normally between 10° and 25°, inclusive, more specifically the value of the angle β is equal to 15°.

The chamfer 110 is characterised by a longitudinal extension "k", with reference to a direction parallel to the axis 101 of symmetry, and by a transversal extension "h" of the second end 103, along a direction at right angles to the direction of the axis 101 of symmetry.

The first end 102 of the pipe 100 does not touch the chamfer 110.

Preferably, the longitudinal extension value "k" of the chamfer 110 is correlated with the real minimum external diameter of the pipe 100, called "$de_{min}$", according to the following relation: $k \geq 0.05\ de_{min}$.

Preferably, the transversal extension value "h" of the second end 103 is correlated with the real value of wall thickness measured at the second end of the pipe 103 according to the following relation: $h \geq 0.5e$.

The pipe 100 has an inner chamber 104 passing from the first end 102 to the second end 103.

The inner chamber 104 has a first section 105, having a first diameter, and a second section 106 has at least a second diameter greater than the first diameter, and a third section 107 for connecting the first section 105 to the second section 106 having a convergent shape from the second section 106 to the first section 105.

The second section 106 has a second diameter greater than the outside diameter "de".

The convergent trend of the third section 107 is inclined relative to a direction parallel to the axis of symmetry 101 defined by an angle of convergence (p the value of which is within a range of ±5° starting from the value of the acute angle of inclination 13 of the chamfer 110 relative to a direction parallel to the axis of symmetry 101, that is to say, $\varphi=\beta\pm5°$.

The third section 107 and the second section 106 define a bell 113 of the pipe 100.

The first section 105 of the inner chamber 104 extends from the second end 103.

With reference to a direction parallel to the axis of symmetry 101, the first section 105 has a length greater than a length of the second section 106.

The inner chamber 104 has a fourth section 108, adjacent to the second section 106 and leading towards the outside environment at the first end 102 of the pipe 100, having a diverging trend starting from the second diameter of the second section 106 towards the outside environment.

The fourth section 108 has an inclination relative to a direction parallel to the axis of symmetry 101 equal to an acute angle "αf", or final acute angle, and a longitudinal extension equal to 'Lf', or final longitudinal extension.

The value of the angle "αf" of the extension "Lf" will be defined below.

In other words, the fourth section 108 is in the form of an inner taper or first end 102 of the pipe 100.

The pipe 100 comprises a gasket 200, positioned in a respective housing seat 111.

The gasket 200 has a circumferential extension relative to the axis of symmetry 101 of the pipe 100.

Figure 2D:
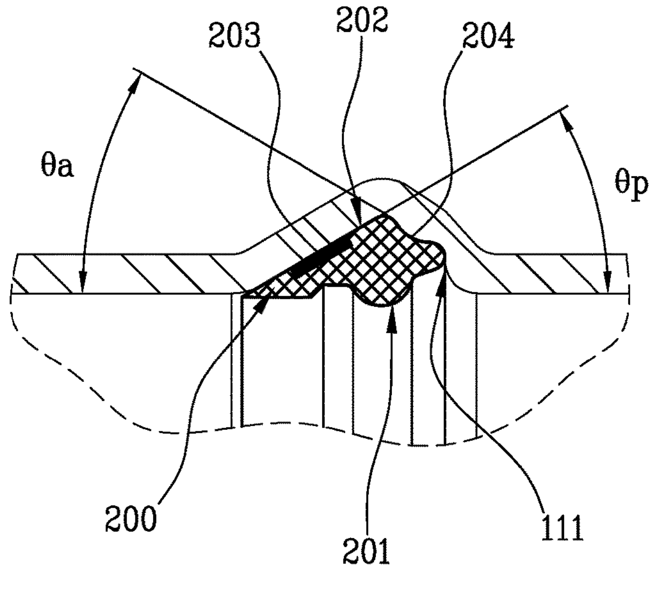
FIG. 2D illustrates a scaled-up view of a detail of FIG. 2C.

The gasket 200 has an inner surface 201, facing the inner chamber 104 of the pipe 100, and an outer surface 202, facing the housing seat 111, as shown schematically in FIG. 2D.

The gasket is positioned along the second section 106 of the inner chamber 104.

The inner surface 201 has a protrusion 207 designed to define the hermetic seal of the gasket 200.

Figure 3:
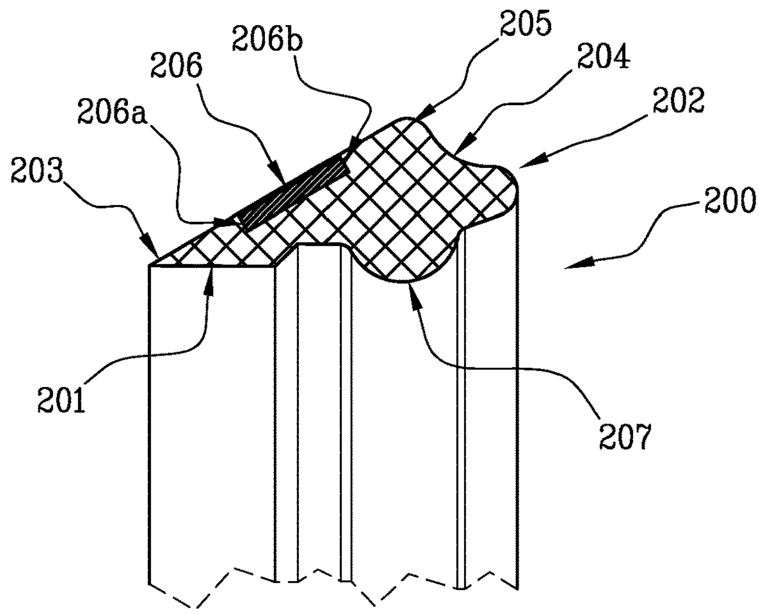
FIG. 3 is a cross section of a gasket which can be used for making the deformed bell-shaped thermoplastic pipe of FIG. 2C.

The outer surface 202 has a first portion 203 and a second portion 204 arranged contiguous to each other and in such a way as to define a cusp 205, as shown in FIG. 3.

The first portion 203 is also referred to as the rear shoulder of the gasket 200.

The second portion 204 is also referred to as the front shoulder of the gasket 200, as shown in FIG. 3.

The first portion 203 and the second portion 204 are inclined relative to a direction parallel to the axis of symmetry 101 of the pipe 100 by a respective acute angle, indicated in the drawings with θp an θa, as shown in FIG. 2D.

The value of the acute angle θp of inclination of the first portion 203 of the outer surface 202 of the gasket 200 relative to a direction parallel to the axis of symmetry 101 of the pipe 100 is preferably between 25° and 35°, in particular equal to 30°.

The value of the acute angle θa of inclination of the second portion 204 of the outer surface 202 of the gasket 200 relative to a direction parallel to the axis of symmetry 101 of the pipe 100 is preferably equal to 25° and 40°, in particular equal to 30°.

The gasket 200 comprises a reinforcing element 206 positioned in the gasket 200 at the first portion 203.

The reinforcing element 206 has a first end **206*a* and a second end 206*b*, shown in FIG. 3**.

Preferably, the reinforcing element 206 is at least partly annular in shape.

More specifically, the reinforcing element 206 is made of metal or plastic material.

Advantageously, the purpose of the reinforcing element 206 is to make the relative gasket in use more resistant to the inner hydrostatic pressure and, consequently, also the bell joint 113 of the pipe 100.

The reinforcement also guarantees the integrity of the gasket when it is subjected to the forces produced by the loading of the gasket 200 on the pad 2 of the belling unit 1, as well as to the forces generated during forming of the bell 113 when the wall of the pipe impacts and surmounts the gasket 200.

Figure 37:
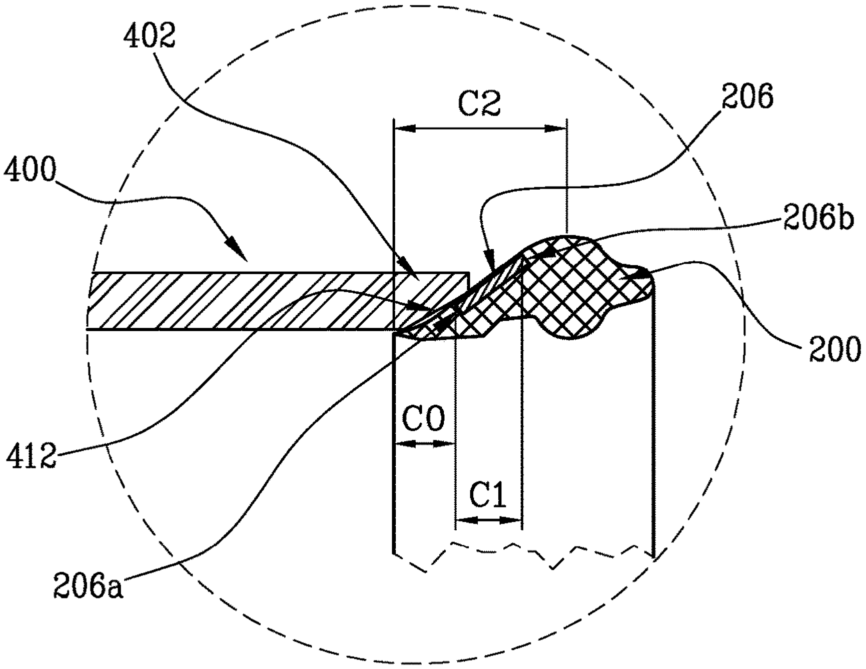

With reference to FIG. 37, the reinforcing element 206, relative to a direction parallel to the axis of symmetry 101, comprises an extension "C1", as explained in more detail below.

Figure 1:
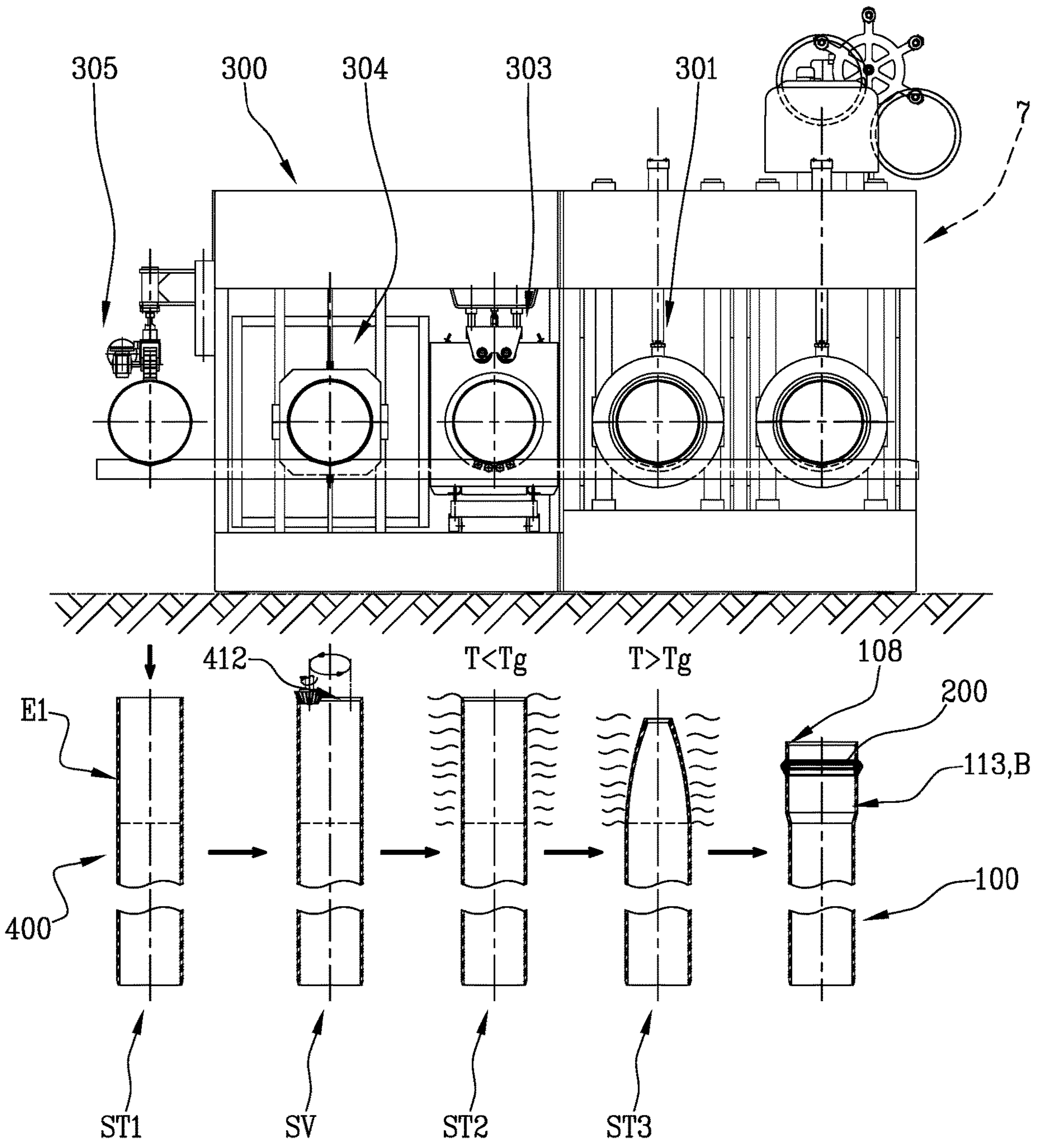
FIG. 1 is a front view of a belling machine according to the invention.

The invention also comprises a belling machine 300 designed to be installed in a plant for producing pipes 100 made of thermoplastic material, as schematically illustrated in FIG. 1.

The plant comprises a processing unit configured for forming an outer chamfer 410 at a second end portion E2 of the pipe 400.

The plant also comprises a belling machine 300 configured for making the finished PVC-O pipes 100, as described above.

In particular, the machine 300 comprises a belling unit 1 which is able to make a bell 113 starting from at least one end portion E1 of a PVC-O pipe 400, in particular starting from the first end 402 of the pipe 400.

The machine 300 for belling pipes 400 made of thermoplastic material of the PVC-O type according to the invention comprises a unit 304 for processing the pipe 400 for removal of material, or plastic deformation.

The processing unit 304 is configured for processing a PVC-O pipe 400, making an inner taper 412 of the first end 402 of the pipe 400.

The processing unit 304 designed to make the inner taper 412 of the first end 402 of the pipe 400 is positioned upstream of a unit 301 for heating the pipe to a predetermined heating temperature and a belling unit 1 (which will be described in more detail below).

Advantageously, the invention consists in making on the pipe 400 partly processed, since it is not yet belled, an inner taper 412 to the wall of the pipe 400, such that when the first end 402 of the pipe 400 strikes against the gasket 200, the taper angle adopted by this taper is equal to or close to the taper value of the first portion 203 of the gasket 200 designed for being inserted in the pipe 400.

Advantageously, the shape of the first end 402 of the pipe 400 of this type considerably increases the contact surface in the impact of the first end 402 of the pipe 400 with the gasket 200 and consequently reduces the contact pressure and the local deformation of the gasket 200.

By way of example, the processing unit 304 is in the form of a planetary machine tool.

As regards the length of the inner taper 412, this must be optimised as a compromise between the guarantee of maintaining the structural and functional integrity of the gasket 200 and a wall thickness in the edge of the bell 113, made at the first end portion E1 of the pipe 400, sufficient to not adversely affect the robustness of the edge of the bell.

The robustness of the edge of the bell 113 is necessary to prevent damage during the operations for transporting and installing the pipe 100.

With the type of gasket 200 considered, the extension of the inner taper 412 is sized in such a way that, in the first impact between the first end 402 of the pipe 400 and the gasket 200, there is contact between the surface of the taper 412 and the rear shoulder 203 of the gasket 200 which faces, at least partly, the reinforcing ring 206.

In general, if the wall thickness of the finished pipe 100, the dimensions and configuration of the gasket 200 allow it, it is advantageous to dimension the extension of the conical surface of the inner taper 412 of the pipe 400 in such a way that, in the first impact between the first end 402 of the pipe 400 and gasket 200, there is full contact between the inner taper 412 of the pipe 100 and the first portion 203 of the gasket 200 up and beyond the part which faces the reinforcing element 206.

Advantageously, these criteria for sizing the inner taper 412 of the pipe 400 established and applicable for some types of gaskets 200 equal to those used for making the Rieber bell in PVC-U pipes can become guidelines for the design of new gaskets optimised and specific for the Rieber belling of PVC-O pipes, given that there are wall thicknesses and diameters of the PVC-O pipe on which the bell will be made with the Rieber system.

These design criteria are aimed at defining shape and sizing of the gasket at least with regard to: taper angle of the first portion 203; extension of the first portion 203; shape of the reinforcing element 206; positioning the reinforcing element 206 relative to the elastomeric matrix of the gasket 200.

When determining the geometry of the inner taper 412 of the edge to be made on the pipe 400 still to be heated, it is necessary to take into account that the wall of the PVC-O pipe at temperatures higher than vitreous transition effects is subjected to diametric and axial contraction effects; these are effects which depend firstly on the degree of circumferential orientation of the pipe 400, on the degree of axial orientation of the pipe 400 and on the thickness of the wall.

These parameters are known and characteristic of the pipe 100 processed.

The contraction effects will then be more or less significant depending on the thermal state of the pipe 400 during its processing.

These effects, when the pipe 400 is heated for the belling, change the angle and length of the taper of the inner taper 412 originally formed on the cold pipe 400, but just a few experimental tests are sufficient to determine the values of the angle and the length of the taper which must be formed on the cold pipe 400 to obtain in the heated pipe for the belling the values of optimum angle and length of the taper.

Not only that, but since the orientation and thickness parameters of the pipe as well as the processing temperatures are fixed, between the geometrical characteristics of the initial taper 412 established on the cold pipe 400 and those modified during shaping of the bell, direct relations are established which can be easily determined by experimentation.

With the apparatus and the process described below in detail, the Rieber bell integrated with the PVC-O pipe 100 is formed.

The bell 113 of the pipe 100 formed is consistent with the functional requirements for: fitting the pipe, hermetic seal and resistance to the hydrostatic pressure of the joint.

With respect to conventional Rieber bells, this Rieber bell formed in the PVC-O pipe has further qualities.

In particular, the inner taper 108 of the pipe 100 remains shaped in the edge of the bell in the finished product.

The taper 108 of the finished pipe 100 originates from the inner taper 412 of the pipe 400 formed before the heating and belling process steps.

The conical surface of the inner taper 108 does not exactly maintain the same dimensions as the surface 412 formed before the belling process, since, during the belling process, during the various steps of heating and shaping the bell, the surface is modified due to the effects of spontaneous contraction of the PVC-O pipe generated by the heating to temperatures higher than the temperature Tg, as well as on account of the simultaneous different actions on the edge of the pipe 400 induced by the belling apparatuses and by the gasket 200.

They are precisely the particular features of the invention both in terms of the belling apparatus and the processing method which maintain in the first end 102 of the finished pipe 100 a conical surface having a taper angle and length which can be correlated with simple coefficients of proportionality, with those formed on the cold pipe 400 before the heating and belling steps.

For this reason, a taper angle of the inner taper 108 of the finished pipe 100 which remains on the end edge of the bell 113 suitably formed relative to the taper angle of the first portion 203 of the gasket 200 integrated in the bell 113 of the pipe 100.

In effect, the process according to the invention and the belling unit conveniently allow the bell to be formed in a hot state of the pipe at relatively low temperatures (95° C.-105° C.), such that the effect of the plastic behaviour of the pipe is reduced, that is to say, insufficient, despite the mechanical actions of the apparatus for forming the bell, for altering the tapered shape of the first end 402 of the pipe 400.

In other words, during the production of the PVC-O pipe the following product parameters are determined and stable:

- diameter of pipe (de);
- pipe wall thickness (e);
- degree of circumferential orientation;
- degree of axial orientation.

In these necessarily repeatable conditions, if the making of the bell in the hot state in the processed PVC-O pipe occurs at relatively low and controlled temperatures (approx. 95° C.-105° C.), the taper 412 is maintained of the first end 402 of the pipe 400, formed on the pipe 400 in the cold state, even if modified in terms of the dimensions of angle and extension, but always with constant and repeatable dimensions, as well as directly correlated with the dimensions of the taper formed in the cold state.

It is precisely the machine and the method according to the invention to allow and make advantageous the processing of shaping of the bell at the indicated temperatures.

If the process for making the pipe 100 and the bell 113 is repeatable, the length Lf and the taper angle of which are established in the first end 102 of the bell 113 definitively formed and cooled will be repeatable.

On the other hand, if the process for producing the pipe 100 and the belling process is not performed correctly or the pipe 400 being processed does not possess the established physical and dimensional characteristics, the regularity of the taper of the inner taper 108 will also not be performed correctly.

For example, if the bell were made with a thermal state at temperatures greater than 105° C., the softening of the material would be such that, in the final shape of the bell, the initial tapered shape of the edge of the pipe 400, formed before heating of the pipe, would be lost, and the degree of orientation of the material in the wall of the bell necessary to guarantee the resistance of the pipe 100 to pressure.

Therefore, during production of the belled pipe, the monitoring of the regularity of the conical surface on the edge of the bell makes it possible to identify faults in the process for making the bell, and consequently the diagnostics of the production process and the quality control of the product are facilitated.

Not only during the production of the pipe, but also subsequently, for example during the operations for laying the conduit, the inner taper 108 of the first end 102 of the pipe 100 is an evident visual indicator of the process used for forming the bell.

The bell 113 with an end edge with a marked inner taper 108 is advantageous for performing the setting up and installation of the conduit.

In effect, in the bell 113 there is a conical inlet which facilitates the insertion of the pipe into the bell of the other pipe to be formed to be joined in the bell joint. In practice, the conical inlet allows jointing operations even when the operating conditions make the alignment between the axes of the pipes to be joined in the bell joint difficult.

Figure 34:
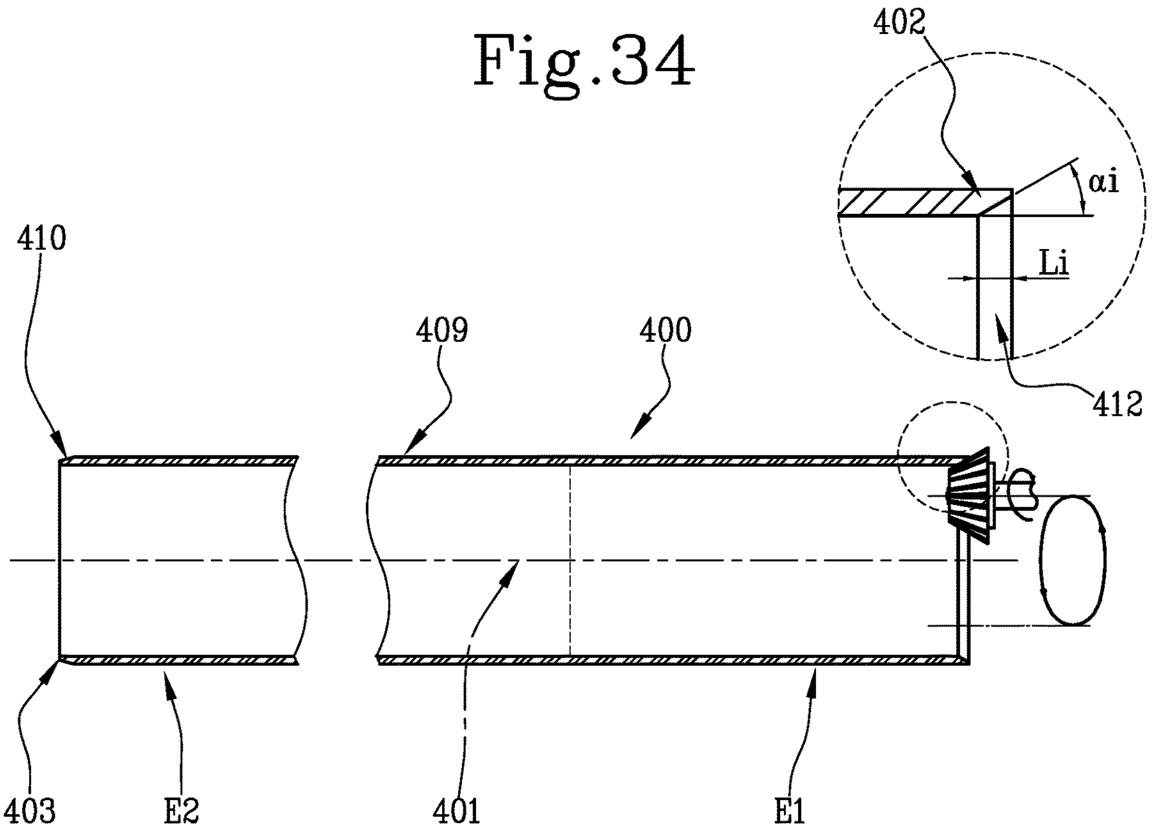

FIG. 34 identifies the geometrical dimensions which characterise the inner taper 412 made on the first end 402 of the pipe 400 before the process for heating the pipe 400.

The term "αi" denotes a taper angle of the inner taper 412 of the first end 402 of the pipe 400 made before the process for heating the pipe 400.

The term "Li" denotes a longitudinal extension of the inner taper 412 of the first end 402 of the pipe 400 made before the heating process.

Figure 35:
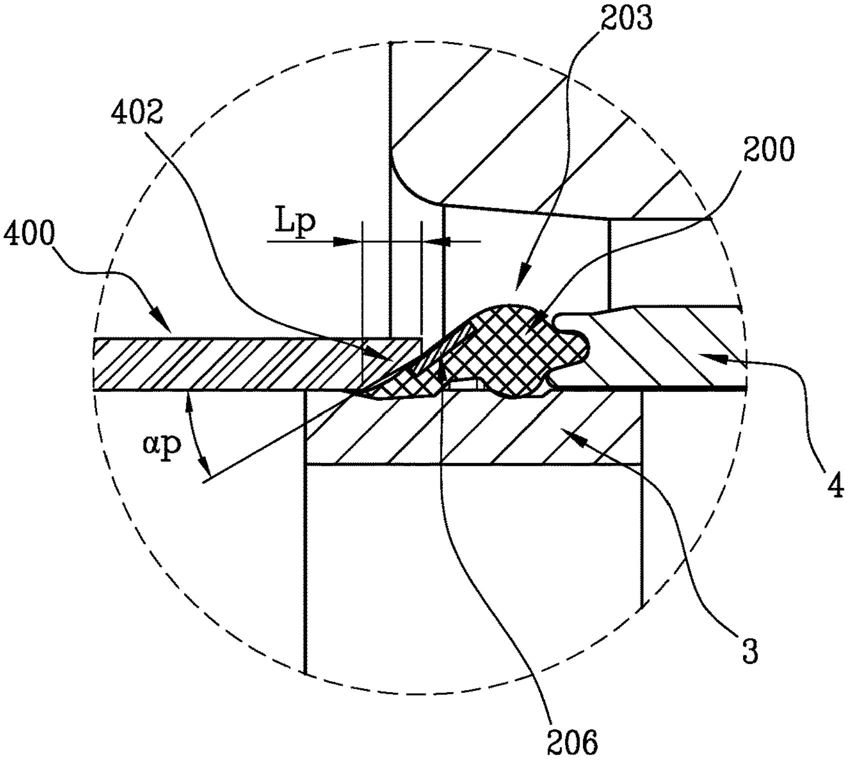
FIGS. 35 and 37 illustrate a scaled-up detail at the moment of first contact between a first end of the pipe and the gasket during belling of the pipe.

FIG. 35 identifies the geometrical dimensions which characterise the inner taper 412, formed at the first end 402 of the pipe 400, during formation of the bell 113 at the moment of first contact between the first end 402 of the pipe 400 and the first portion 203 of the gasket 200 installed on the pad 2.

The term "αp" denotes a taper angle of the inner taper 412 of the first end 402 of the pipe 400 at the moment of impact of the first end 402 of the pipe 400 with the first portion 203 of the gasket 200 installed on the pad 2.

The term "Lp" denotes a longitudinal extension of the inner taper 412 of the first end 402 of the pipe 400 at the moment of impact of the first end 402 of the pipe 400 with the first portion 203 of the gasket 200 installed on the pad 2.

Figure 36:
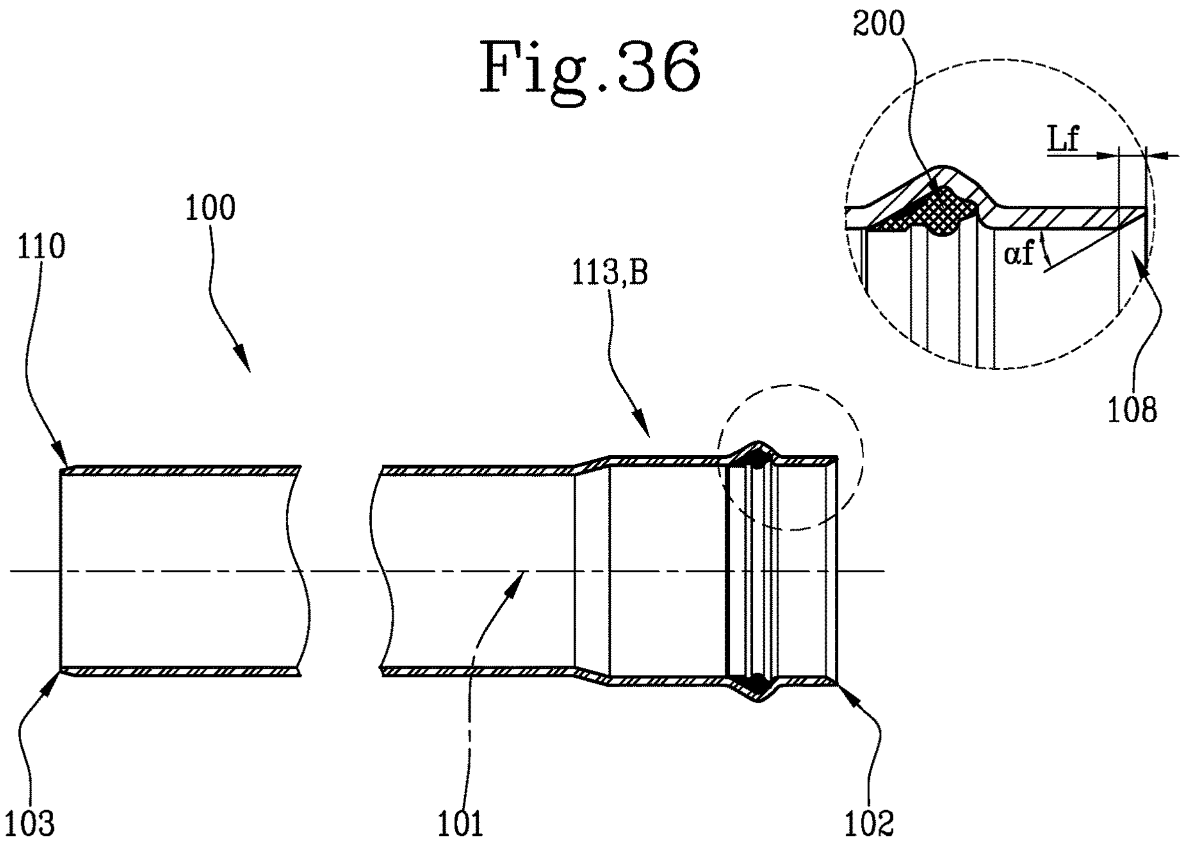

FIG. 36 identifies the geometrical dimensions which characterise the inner taper 108 of the first end 102 of the pipe 100 completely formed and definitively cooled.

The term "αf" denotes a taper angle of the inner taper 108 of the first end 102 of the finished pipe 100.

The term "Lf" denotes a longitudinal extension of the inner taper 108 of the first end 102 of the finished pipe 100.

FIG. 37 identifies the extension and the localisation of the reinforcing element 206 at the first portion 203 of the gasket 200.

In this drawing, the extension and the localisation of the reinforcing element 206 are compared with the geometrical dimensions 200 which characterise the inner taper 412 formed at the first end 402 of the pipe 400, during formation of the bell, at the moment of first contact between the first end 102 of the pipe 100 and the first portion 203 of the gasket 200 installed on the pad 2.

With reference to a direction parallel to the axis 401 of the pipe 400 there is:

C0=distance between the vertex of the first portion 203 of the gasket 200 and the first end 206*a* of the reinforcing element 206.

C1=longitudinal extension of the reinforcing element 206

C2=longitudinal extension of the first portion 203 of the gasket 200.

Experimental tests have shown that in order for the inner taper of the end edge of the pipe to be advantageous, the relations (1) and (2) described below must be complied with.

$$\alpha p = \theta p \pm 10° \quad (1)$$

$$C2 > Lp \geq C0 + 0.1C1 \quad (2)$$

After defining the values of αp and Lp, the corresponding values of αi and Li which generate αp and Lp such as to comply with the conditions (1) and (2) are identified by experimental tests. Unique relations are established of the values of αi and Li with the values of αp and Lp.

$$\alpha i = m\alpha p$$

$$Li = n\ Lp$$

The final bell 113 will maintain an inner taper of the end edge defined by values of αf and Lf which are different from αp and Lp, but correlated by unique relations with the values of αp and Lp.

$$\alpha f = r\alpha p$$

$$Lf = s\ Lp$$

The coefficients m, n, r and s are conditioned by the characteristic parameters of the processed PVC-O pipe such as: diameter of pipe (de); pipe wall thickness (e); degree of circumferential orientation of the pipe; degree of axial orientation of the pipe.

They are known and fixed parameters, the variation of which falls within the normal tolerances of the production processes of that predetermined pipe.

With reference to the condition (1), the optimum situation is that for which: αp=θp.

A correspondence of the following type therefore applies: αf=r θp.

For the various, but determined pipes of industrial interest to which the invention is intended there is: αf=r θp with 2.5≥r≥0.75.

As regards the extension Lf of the inner taper 108 which remains in the end edge of the bell, for the various but determined pipes of industrial interest to which the invention is intended, it is convenient to select a value of Li such that, as well as generating a value Lp which respects the condition (2), it generates an Lf value which respects the following condition.

$$LF \geq 0.1C1.$$

Downstream of the processing unit 304 there is the unit 301 for heating the pipe to a predetermined heating temperature and the belling unit 1 (which will be described in more detail below).

The machine 300 comprises a unit 302 for cooling the pipe, associated with said belling unit 1 for cooling the pipe 400 fitted on a forming pad 2 (shown in FIG. 20, described in more detail below and forming part of the belling unit 1).

The forming pad 2 is configured to engage with an end portion E1 of the pipe 400 starting from the first end 402.

The belling machine 300 therefore comprises a plurality of stations, operating in sequence on the pipe 400 (in particular on the end portion E1 of the pipe 400 starting from the first end 402).

The station ST1 for receiving the pipe is configured for picking up the pipe 400 (suitably cut and chamfered in the end edge 403) from the extrusion line.

The station for receiving the pipe therefore comprises, for this purpose, a pick-up unit 305.

Downstream of the station ST1 for receiving the pipe, the machine 300 comprises a taper station SV wherein the unit 304 for processing the pipe 400 is operatively active at the first end 402.

The machine comprises a pre-heating station ST2, wherein the unit 303 for pre-heating the pipe 400 is operatively active, in which the pipe 400 is positioned after the station for tapering the pipe.

In the pre-heating station ST2, the pipe 400 is heated preferably to a temperature lower than the vitreous transition temperature (Tg) of the PVC.

The machine also comprises a heating station ST3, wherein the unit 301 for heating the pipe 400 is operatively active.

The pipe 400 is positioned in the heating station after the pre-heating station.

In this heating station ST3, the pipe 400 is heated to a temperature higher than the vitreous transition temperature of the PVC, and in any case higher than the heating temperature.

The presence of a pre-heating station ST2 is optional, as the machine 300 may also comprise only one heating station ST3.

Optionally, the machine 300 comprises a preheating unit 303, positioned upstream of the heating unit 301, and configured for heating the pipe 400 to a predetermined preheating temperature, which is lower than the heating temperature.

Preferably, the pre-heating unit 303 comprises an oven.

Preferably, the heating unit 301 comprises an oven.

Preferably, the oven is a contact oven.

The oven heats the end portion E1 of the pipe 400 in a differentiated manner along the longitudinal direction of the pipe 400.

The heating station ST3 also comprises an inner contact element, which is positioned inside the pipe to support internally the end portion E1 of the pipe 400 during the heating, and prevent the diametric contraction of the pipe.

At the end of the heating step the temperature of the pipe 400 is approximately 100° C. towards the end and decreases to 80° C. in the zone which will constitute the connecting wall between pipe and bell.

Figure 4A:
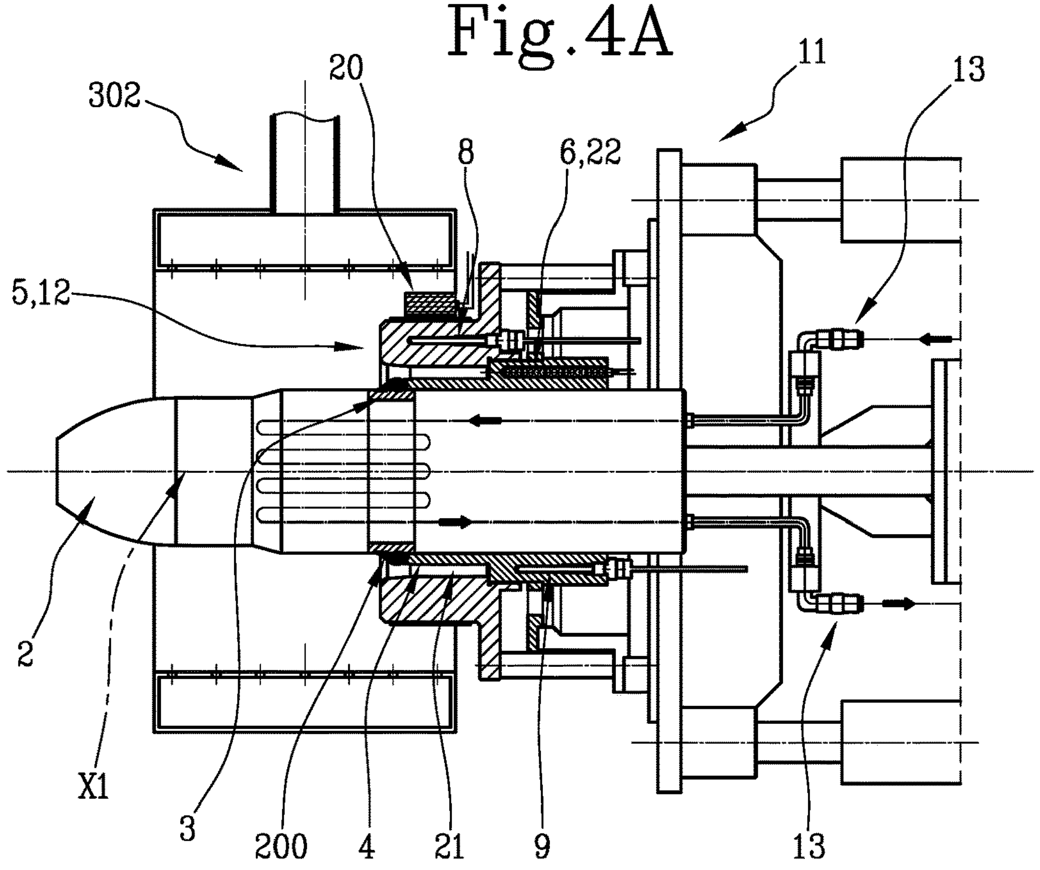
FIG. 4A is a partial cross section of a belling unit, forming part of the machine of FIG. 1, according to the invention.
Figure 4B:
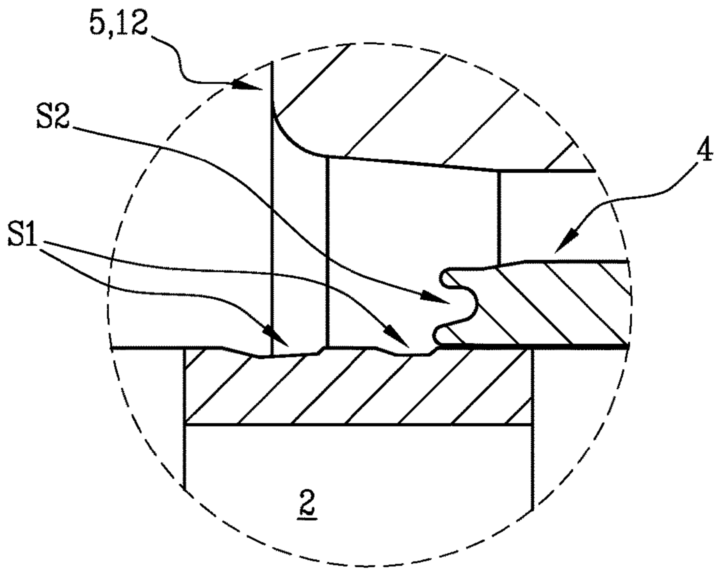
FIG. 4B illustrates an enlargement of FIG. 4A (in which the gasket of the pipe is not shown)

The invention relates to a unit 1 for belling pipes T made of thermoplastic material of the PVC-O type (forming part of the machine 300) which comprises a forming pad 2 for deforming into the shape of a bell B an end portion E1 of a pipe 400 made of thermoplastic material, said pad 2 having a longitudinal central axis X1 of symmetry and a region 3 for housing an annular gasket 200 designed to be coupled, internally, to the pipe 400 made of thermoplastic material, see FIG. 4A.

It should be noted that the inner taper 412 of the pipe 400 makes it possible to drastically reduce the contact pressure between the rear shoulder 203 of the gasket 200 and the first end 402 of the pipe 400.

As mentioned in the prior art, the problem of collapse of the gasket 200 arises during the step in which the pipe 400 is inserted in the gasket 200 housed on the pad 2.

Subjected to the forces induced by the wall of the pipe 400, the gasket 200 is compressed by the first end 402 of the pipe 400 against a contact element 4 and the pad 2.

In the consequent deformation of the gasket 200, the first portion 203 tends to adopt increasingly pronounced taper angles, increasing the contrast to the progressive insertion of the pipe 400.

Advantageously, according to the invention, the forces which stress the gasket 200 prevent damage to the gasket 200, in particular in the zone of discontinuity which separates the reinforcing element 206 from the elastomer body of the gasket 200, that is to say, the boundary zones between the reinforcing element 206 and the elastomer body at the first portion 203 of the gasket 200.

An annular contact element 4 fitted slidably on said pad 2 to move along the direction of said longitudinal central axis X1, between an advanced position P1, and a withdrawn position P2.

The unit 1 comprises a first heating device 6, configured for heating said annular contact element 4 to a temperature (greater than the vitreous transition temperature) and therefore heating by contact the inner surface of the end portion E1 of the pipe 400 fitted on the annular contact element 4.

A second heating device 5, configured for heating from the outside said pipe 400 made of thermoplastic material fitted on the forming pad 2 in a predetermined zone of the pad 2 (more specifically, which extends from the zone proximal to the region 3 designed for housing the gasket 200 up to the first end 402 of the pipe 400).

It should be noted that the assembly made up of the second heating device 5 and the first heating device 6 makes it possible to define a hot (cylindrical) chamber 21.

With reference to the second heating device 5, it should be noted that the device comprises, preferably, an annular heating element 12.

Said annular heating element 12 is preferably made of metallic material, preferably an aluminium alloy.

The second heating device 5 may comprise a plurality of heating elements 20, positioned in (around, or embedded in) said annular heating element 12, for generating heat from a plurality of different zones.

According to a variant, the second heating device 5 may comprise a single electrical resistance, positioned in (around, or embedded in) said annular heating element 12.

The electrical resistance(s) is/are configured for uniformly heating the annular heating element 12.

The second heating device 5 heats, from the outside, preferably the end portion E1 of the pipe 400 starting from the first end 402 up to the region 3 designed for housing the gasket 200.

The annular heating element 12 is configured for forming with the annular contact element 4, heated by the first device 6, the hot chamber (cylindrical) 21.

This hot chamber 21 is preferably sized to contain internally a portion of the end pipe 400 fitted on the annular contact element 4.

The wall of the end portion E1 of the pipe 400 is therefore contained in the hot chamber 21, with the relative inner surface in contact with the surface of the annular contact element 4 and with the adjacent outer surface detached from the inner surface of the annular heating element 12.

It should be noted that the predetermined distance between the outer surface of the wall of the pipe 400 and the inner surface of the annular heating element 12 allows the insertion in the hot chamber 21 of the wall of the pipe without interference (without contact) with the annular heating element 12.

Experimental tests have led to the conclusion that the optimum distance between the wall of the pipe 400 and the inner surface of the annular heating element 12 is between 0.5 and 10 mm; more preferably between 1 and 8 mm; still more preferably, between 2 and 6 mm.

The annular heating element 12 is positioned in such a way that the distance between the wall of the pipe 400 and the inner surface renders negligible the convective effects generated by the hot air, which would disturb the transmission of heat towards the pipe 400.

The transmission of heat from the annular heating element 12 to the pipe 400 occurs mainly by irradiation.

Preferably, the second heating device 5 heats the end portion E1 of the pipe 400 in the absence of contact (the pipe is preferably positioned not in contact with the annular heating element 12).

Preferably, the second heating device 5 heats the end zone of the pipe 400 by irradiation.

Experimentally and advantageously, it has been found that the fact of heating, from the inside the end portion E1 of the pipe 400 fitted on the annular contact element 4 by contact with the element 4 (heated by the first device 6) and from the outside using the heating element 12 heated by the second device 5, during the operation for shaping the bell, more specifically, with a homogeneous heating and at a predetermined temperature, it allows the belling of PVC-O to be considerably improved, allowing the formation of bells in pipes made of PVC-O with larger dimensions (diameter and thickness of walls) than those which can be processed according to conventional techniques.

The unit 1 according to the invention is therefore able to process PVC-O pipes with large diameters/wall thicknesses.

According to another aspect, the forming pad 2 is equipped with a first annular seat S1 for housing at least a part of said gasket 200.

According to yet another aspect, the annular contact element 4 is equipped with a second seat S2 for housing the gasket 200, configured to house at least a part of said gasket 200.

Advantageously, the seats S1 and S2 are shaped for receiving respective portions of the gasket 200, in particular portions of the inner surface 201 of the gasket 200.

In particular, the seats S1 and S2 are shaped to allow the maximum adhesion between the gasket and, respectively, the forming pad 2 and the annular contact element 4.

It has been found experimentally by the Applicant that the presence of the second seat S2 for housing the gasket 200 facilitates the insertion of the pipe 400 on the pad 2 and on the gasket 200, reducing in a certain way (as far as possible) the risk that the gasket 200 can undergo serious damage, as a result of the forces originating by contact with the pipe 400.

The second seat S2 limits, in effect, the deformation of the gasket which occurs when the pipe 400 is fitted on it, receiving a part inside it.

Preferably, the second seat S2 has a concave shape towards the distal part of the pad 2 (that is, towards the clamp 10).

The first annular housing seat S1 substantially has the same technical effect described above with regard to the second seat S2.

The first annular housing seat S1 therefore contributes to the technical effect of limiting the deformation of the gasket 200 during the belling, receiving a part inside it, thereby reducing the risk of excessive deformation of the gasket 200.

According to yet another aspect, the unit 1 comprises a control and operating unit 7 (electronic, comprising hardware and/or software).

According to yet another aspect, the belling unit 1 comprises a first (temperature) sensor 9 configured for measuring the temperature at said first heating device 6 (more precisely for measuring the temperature of the annular contact element 4).

According to another aspect, the unit 1 comprises a second (temperature) sensor 8 configured for measuring the temperature at said second heating device 5.

Preferably, but not necessarily, the first sensor 9 is a thermocouple.

Preferably, but not necessarily, the second sensor 8 is a thermocouple.

The control and operating unit 7 is configured for adjusting the second heating device 5 as a function of a temperature value measured by the second sensor 8, to perform a heating of a portion of the pipe 400 at the region 3 designed for housing the gasket 200 up to the first end 402 of the pipe 400 to a predetermined temperature.

The control and operating unit 7 is configured for adjusting said first heating device 6 as a function of a temperature value measured by the first sensor 9, to perform a heating of the annular contact element 4 to a predetermined temperature (higher than the vitreous transition temperature).

According to yet another aspect, the apparatus 1 comprises a clamp 10 for clamping the pipe.

Said clamp 10 is provided with clamping jaws (10A, 10B), movable relative to each other between a closed configuration and an open configuration (in particular, preferably, a first and a second jaw).

The clamping clamp 10 constrains the pipe 400 in a horizontal position in such a way that the longitudinal axis 401 of the pipe 400 coincides with the axis X1 of the forming pad 2.

According to another aspect, the forming pad 2, the annular contact element 4 are supported by a carriage 11.

More specifically, the forming pad 2, the annular contact element 4, the first heater 5 and the second heater 6 are supported by the carriage 11 (movably relative to the frame of the machine).

It should be noted that the annular contact element 4 is configured to be able to move relative to the carriage 11, that is, relative to the forming pad 2.

More specifically, the annular contact element 4 is supported by the carriage 11 with the possibility of movement independently of it.

Preferably, the annular contact element 4 and the second heater 5 are integral with each other (that is, always moved as one) in the movement with respect to the pad 2.

According to another embodiment, the annular contact element 4 can be moved independently of the second heating device 5 in the relative motion with respect to the pad 2.

This last embodiment offers the advantage of a greater adaptability to variations in the operating conditions; more specifically, when the annular contact element 4 withdraws and detaches from the pipe 400 the second heating device 5 may remain in the heating position, providing a heating contribution on the part of the pipe which, under spontaneous contraction, forms on the gasket and pad.

As a result, the spontaneous contraction effect of the end wall of the pipe is increased.

The carriage 11 is configured to be movable between a position P4 close to the pipe 400 and a position P5 away from the pipe 400.

The carriage 11 is driven by respective actuator means (not illustrated).

With reference to the annular contact element 4, it should be noted that, preferably, the annular contact element 4 is a hollow cylindrical body (preferably made of metal).

More specifically, it should be noted that the annular contact element 4 is mounted on the carriage 11 movably relative to the forming pad 2: in other words, the forming pad 2 and the annular contact element 4 are configured to be able to move independently.

The annular contact element 4 is slidable on the forming pad 2; more precisely, the inner surface of the annular contact element 4 slides on the outer surface of the forming pad 2.

With reference to the fitting of the gasket on the forming pad 2, the unit 1 may comprise means for picking up and moving the gasket 200, not illustrated since it is of the conventional type.

With reference to the gasket 200, it should be noted that it is positioned, before the pipe 400 is fitted on the pad 2, in the region 3 for housing the pad 2.

The housing region 3 is defined by a lowered zone formed on the outer surface of the pad 2.

With reference to the pad 2, it should be noted that the unit 1 comprises a heater configured for heating the forming pad 2.

The pad 2 may be heated, according to a non-limiting example, by means of an internal circuit for circulating a heating fluid (for example, water), labelled 13.

Preferably, the pad 2 is heated to temperatures of between 40° C. and 65° C. (below the vitreous transition temperature of PVC-O).

Still more preferably, the pad 2 is heated to a temperature of between 45° C. and 60° C. (or alternatively to temperatures of between 45° C. and 55° C.).

With reference to the annular contact element 4, it should be noted that it is preferably heated (by the first heating device 6) to a temperature of between 85° and 105° C. (more preferably between 90° and 100° C., even more preferably between 92° C. and 100° C.).

By way of example, the first heating device 6 is defined by electrical resistors 22.

The electrical resistors 22 are controlled by the control and operating unit 7.

The invention provides a method for processing pipes 100 made of thermoplastic material of the PVC-O type according to the invention.

The method comprises the following steps:

- a step of feeding pipes 400 into a station ST1 for receiving the pipe 400;
- a step of making an inner taper 412 at the first end 402 of the end portion E1 of the pipe 400, in a tapering station SV;
- a step of heating the end portion E1 of the pipe 400, in a heating station ST3, after the step of making the inner taper 412;
- a step of belling the end portion E1 of the pipe 400, after the step of heating the end portion E1 of the pipe 400.

Advantageously, the shape of the end portion E1 which has at the first end 402 of the pipe 400 the inner taper, considerably increases the contact surface in the impact of the first end 402 of the pipe 400 with the gasket 200 and consequently reduces the contact pressure and the local deformation of the gasket.

Advantageously, the extension of the taper, which is at least equal to an extension which allows in the impact contact with the reinforcing element 206, favours the contact between the first portion 203 of the gasket 200 without damaging it.

The belling step comprises preparing a forming pad 2 designed to deform into a bell shape an end portion E1 of a pipe 400, starting from a first end 402, made of thermoplastic material; preparing an annular contact element 4, fitted on said forming pad 2, and movable along said forming pad 2 between an advanced position P1, and a withdrawn position P2; preparing an annular gasket 200 on said forming pad 2 in a predetermined region 3, said annular gasket 200 being designed to be stably located in the bell B to be formed (integrally with the finished pipe 100), positioning said annular contact element 4 in the advanced position P1 to make contact with the gasket 200 set up in the region 3, preparing a pipe 400 having an end portion E1 of the pipe 400 heated to a predetermined temperature (greater than the vitreous transition temperature Tg) designed to allow the deformation; moving, up to a predetermined distance, relative to each other, said end portion E1 of the pipe 400 and said pad 2, towards each other in the direction of an axis of symmetry 401 of the pipe 400, for fitting said end portion E1 on the assembly of said end pad 2 and said gasket 200 and said annular element 4.

The method also comprises the following steps: heating the annular contact element 4 to a predetermined temperature (greater than the vitreous transition temperature) in such a way as to heat by contact the inner surface of the portion of the end pipe 400 fitted on the annular contact element 4 and, simultaneously, heating from the outside said pipe 400 made of thermoplastic material fitted on the forming pad 2, in a predetermined zone of the pad 2 which extends from the area proximal to the region 3 for housing said gasket 200 up to the first end 402 of the pipe 400.

Moving said annular contact element 4 from the advanced position P1 to the withdrawn position P2, to release (not make contact with) the annular contact element 4 from the gasket 200 and from the pipe 400.

According to yet another aspect, the annular contact element 4 is provided with a second seat S2 for housing a portion of the gasket 200 and the step of positioning said annular contact element 4 in the advanced position P1 comprises a step of receiving at least a portion of the gasket 200 inside the second housing seat S2.

According to yet another aspect, the forming pad 2 is provided with a first annular seat S1 for housing the gasket 200, facing radially towards the outside of the pad 2, and the step of fitting said end portion E1 of the pipe 400 on the assembly of said pad 2 and said annular gasket 200 comprises a step of receiving at least a portion of the gasket 200 inside the first seat S1 for housing the forming pad 2.

According to another aspect, the step of preparing an annular gasket 200 on said forming pad 2 in a predetermined position comprises a step of fitting said gasket 200 on the forming pad 2 and moving the annular contact element 4 from the withdrawn position P2 to the advanced position P1 to make contact with the gasket 200 and move it to the predetermined position of said forming pad 2.

According to yet another aspect, before the step of moving, up to a predetermined distance, relative to each other said end portion E1 of the pipe 400 and the pad 2, the method comprises a step of clamping the pipe by closing a clamp 10.

According to another aspect, the method comprises a step of releasing the pipe 400 by opening the clamp 10 for a predetermined time, after the steps of: moving, up to a predetermined distance, relative to each other said end portion E1 of the pipe 400 and said forming pad 2, towards each other in the direction of a longitudinal central axis 401 of the pipe 400; positioning said annular contact element 4 in the advanced position P1, for making contact with the pipe 400 and the gasket 200 of the pipe; heating to a predetermined temperature, from the inside and, simultaneously, heating to a predetermined temperature, from the outside, the end portion E1 of a pipe 400 made of thermoplastic material in the zone which extends from the housing region 3 in which said gasket 200 is positioned up to the first end 402 of the pipe 400, for a predetermined time.

According to yet another aspect, the step of releasing the pipe by opening the clamp 10 is carried out before, or partly superposing on, a step of moving said annular contact element 4 from the advanced position P1 to the withdrawn position P2, so as to release it from the gasket 200 and from the pipe 400.

According to another aspect, the method comprises, after the step of releasing the pipe 400 by opening the clamp 10 for a predetermined time, a step of further clamping the pipe 400 by closing the clamp 10.

According to yet another aspect, the method comprises, after the step of moving said annular contact element 4 from the advanced position P1 to the withdrawn position P2, to release from the gasket 200 of the pipe 400, a step of moving the annular contact element 4 from the withdrawn position P2 of disengagement towards the advanced position P1 of engagement, up to an intermediate position P3 of engagement of the annular contact element 4 with an end part 402 of the pipe 400 between the gasket 200 and the end edge 402 of the pipe 400.

Advantageously, this allows a bell B to be obtained wherein the gasket 200 has a desired final internal diameter, since the end of the pipe 400 is stressed by the annular element 4, when it is still in a malleable phase (not completely cooled), allowing the pipe 400 and seat of the gasket 200 to be modelled so that, once the finished pipe 100 has cooled, the gasket 200 has the correct final diameter and can correctly receive the coupling of another pipe 100.

In the process for forming the bell, when the wall of the pipe 400 has formed completely on the gasket 200 and on the pad 2 and the step of cooling and final stabilising of the bell has still not been activated, the response to the mechanical stress of the wall of the bell, even though mainly elastic, is, in general, elasto-plastic.

In particular, the plastic behaviour is accentuated in the zone of the bell adjacent to the front shoulder of the gasket 200 up to the end edge of the bell.

In effect, this zone has been subjected to the transmission of the heat of the hot chamber and, thanks also to this heating, has maintained a residual plasticity.

If during this step of the process for forming the bell an advancing movement of the annular contact element 4 towards the edge of the bell of the pipe 400 is activated, moving the annular contact element 4 to a predetermined height at which the edge of the bell is pressed, a beneficial release of the radial pressure action of the wall of the bell is applied on the gasket 200.

During this step, the gasket 200 is compressed and flattened by the wall of the bell towards the pad 2.

The gasket 200 is elastic; so, even if the inner wall of the bell in the zone of the gasket expands, the gasket 200 always maintains the adhesion to the inner wall of the bell, that is to say, it recovers elastically part of the previous flattening. Simultaneously, the progressive cooling of the wall of the bell of the pipe 400 continues, so that at the end of the contact action with the edge of the pipe 400 of the annular contact element 4, that is, when the annular contact element 4 is moved from the intermediate position P3 to the withdrawn position P2, the elastic relaxation of the gasket 200 is partly preserved, since the mechanical response of the part of the bell to the stress induced by the annular contact element 4 is not completely elastic, but elasto-plastic.

This partial relaxation of the gasket 200 is sufficient to ensure that, after extracting the pad 2 from the definitively cooled bell, the internal diameter of the pipe 100 at the gasket is the one desired (necessary for the correct functionality of inserting a further pipe in the bell with a guarantee of the seal).

FIGS. 5 to 22 are briefly described below which illustrate, in detail, the method according to the invention.

FIGS. 5 to 22 show the steps of the belling cycle.

Figure 5:
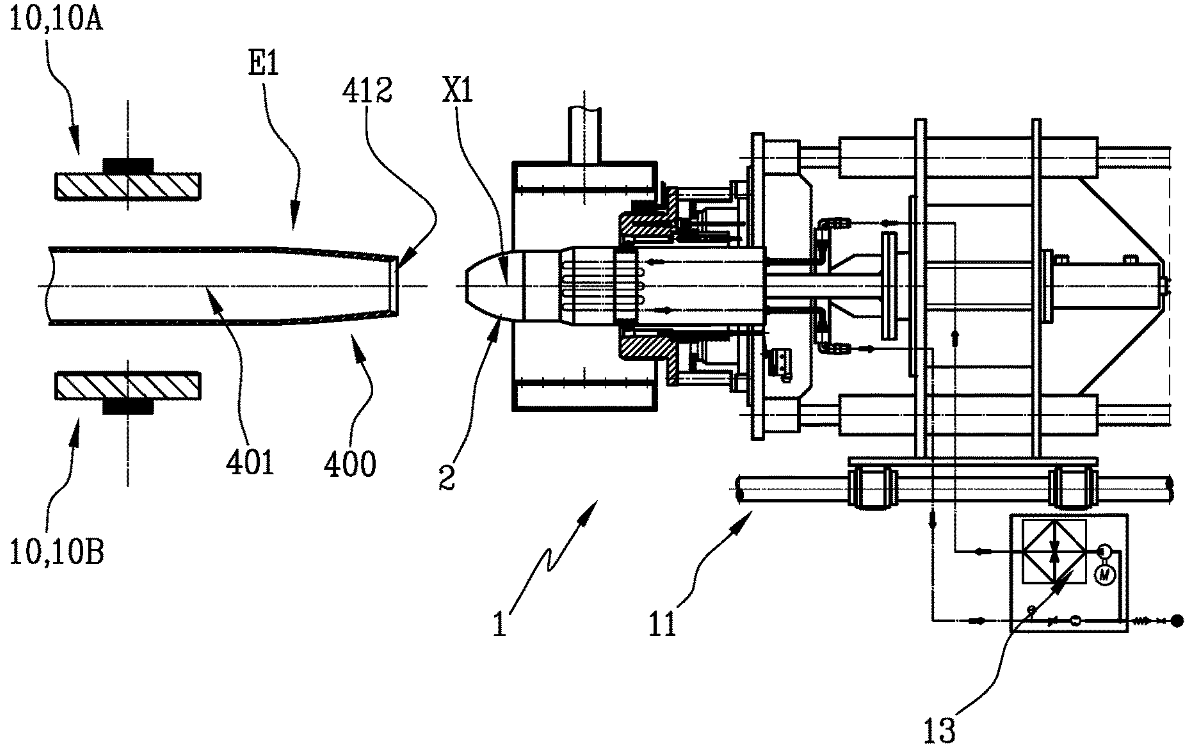
FIGS. 5 to 22 schematically illustrate the belling unit of FIG. 4 and the pipe, in different sequential steps of making the bell on an end of the pipe.

FIG. 5 illustrates the step of positioning the pipe 400 inside the clamp 10.

As is evident, the pipe 400 is positioned with its axis 401 aligned with (coinciding with) the axis X1 of the forming pad 2 (coinciding with the axis of the contact element 4).

Figure 6:
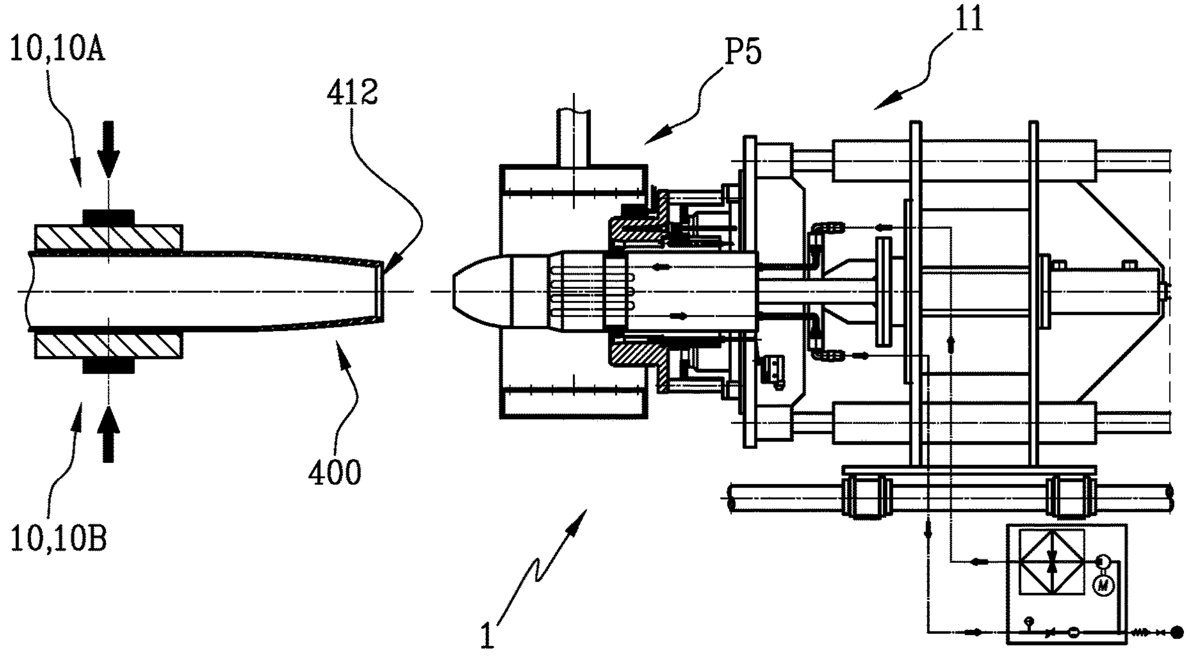
Figure 7:
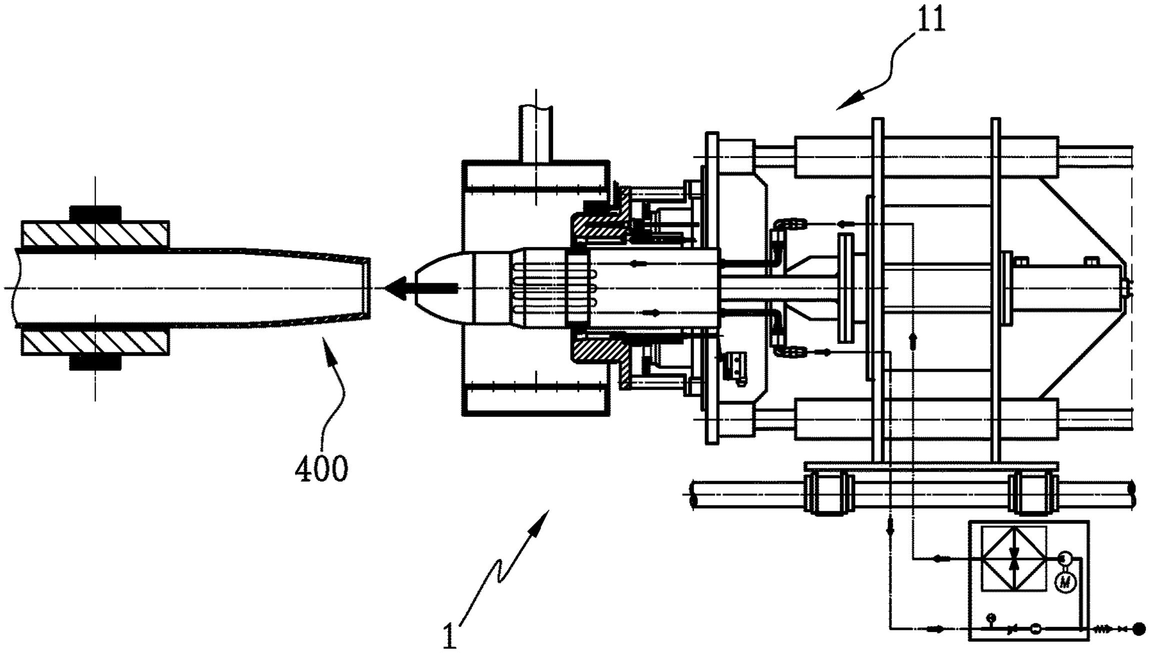
Figure 8:
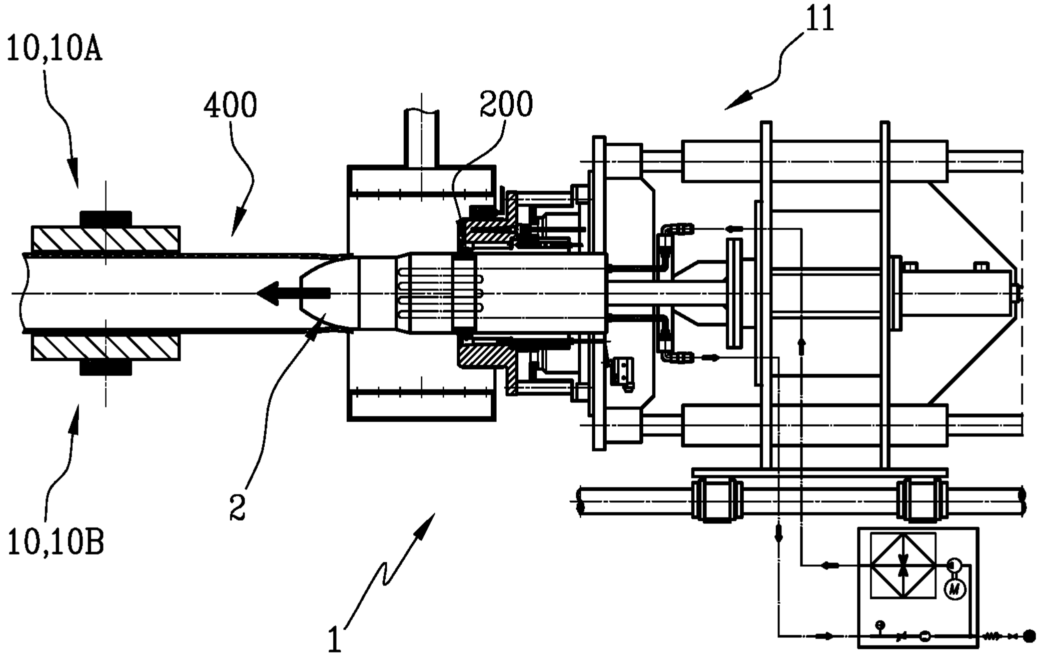
Figure 9:
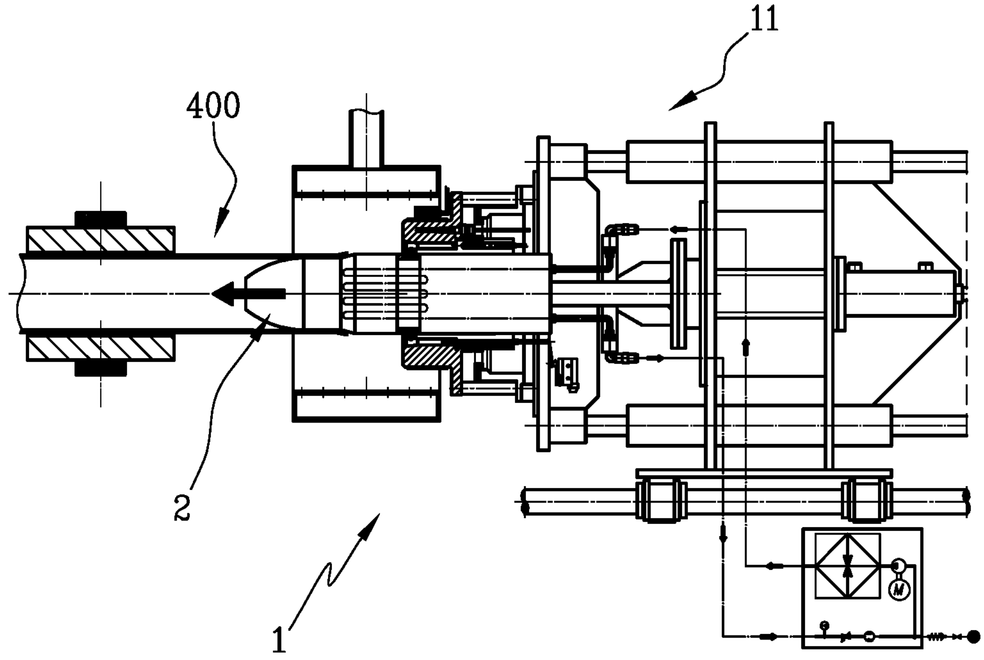
Figure 10:
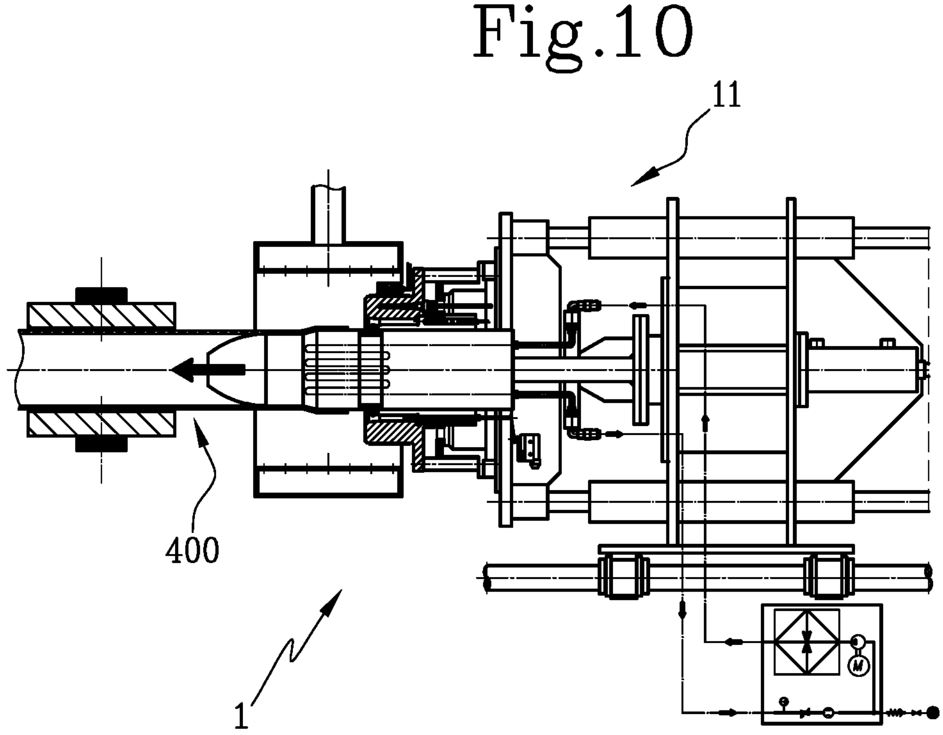
Figure 11:
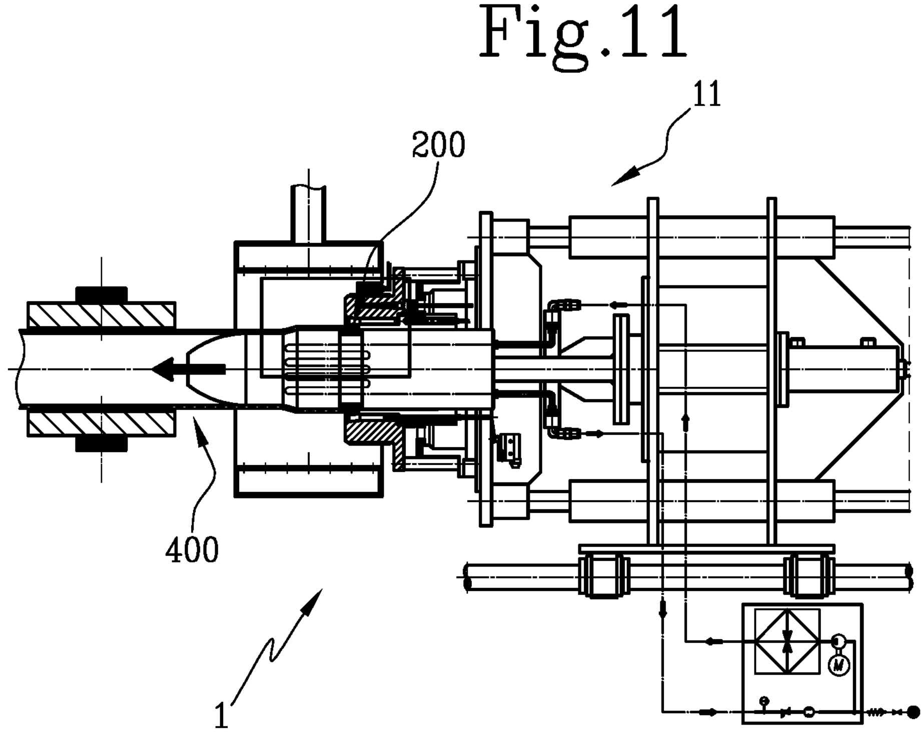
Figure 12:
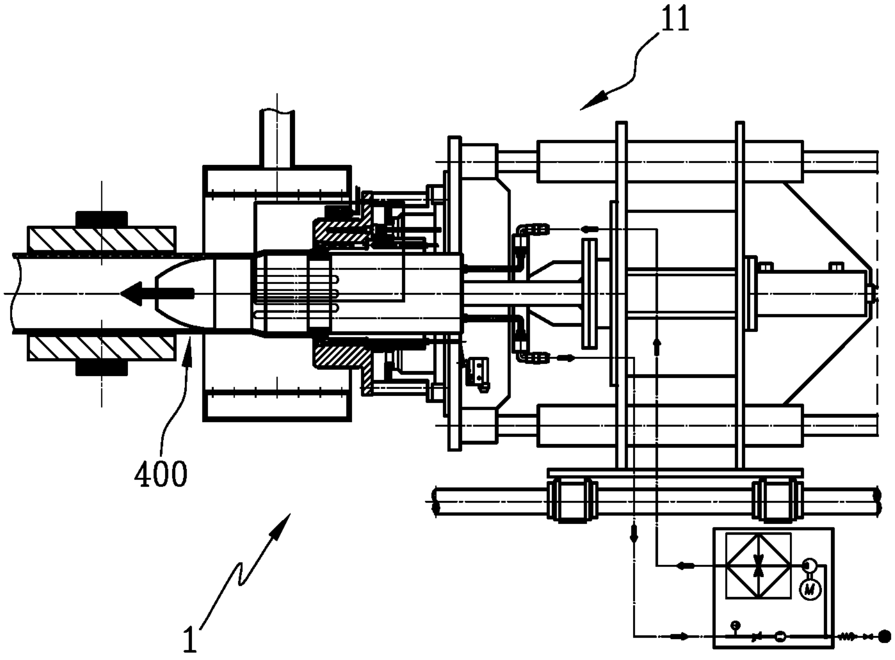
Figure 13:
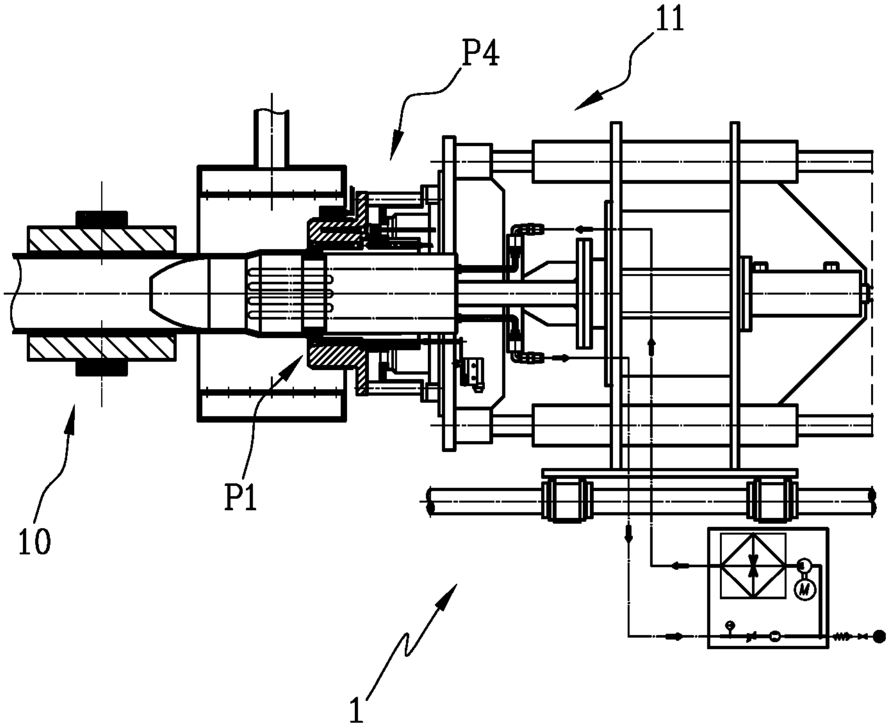

FIG. 6 illustrates the step of closing the clamp 10. The pipe 400 is locked between the jaws (10A, 10B) of the clamp 10.

FIGS. 7 to 14 illustrate the advancing of the carriage 11 towards the pipe 400, in different advancing positions, respectively. During these steps, the pipe 400 is progressively inserted on the forming pad 2 (the pipe is fitted on the forming pad 2, inserted in the gasket 200 and lastly in the annular contact element 4, that is to say, inserted in the hot chamber 21).

During these steps, the carriage 11 is moved from the far position P5 to the close position P4.

Figure 14:
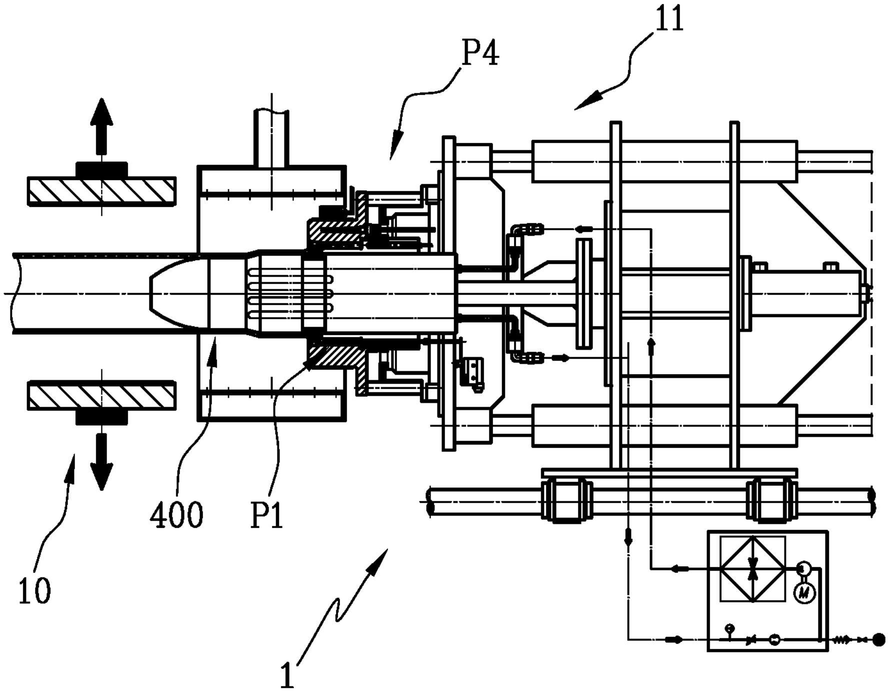

FIG. 14 illustrates a step wherein the carriage 11 is in the close position P4 and the annular contact element 4 in the advanced position P1.

During this step, the clamp 10 is in the open configuration, that is, the respective jaws (10A, 10B) are open.

The drawing shows the start of the step of extending the bell being formed, wherein the jaws 10A, 10B of the clamp 10 are kept open for a predetermined time.

Figure 15:
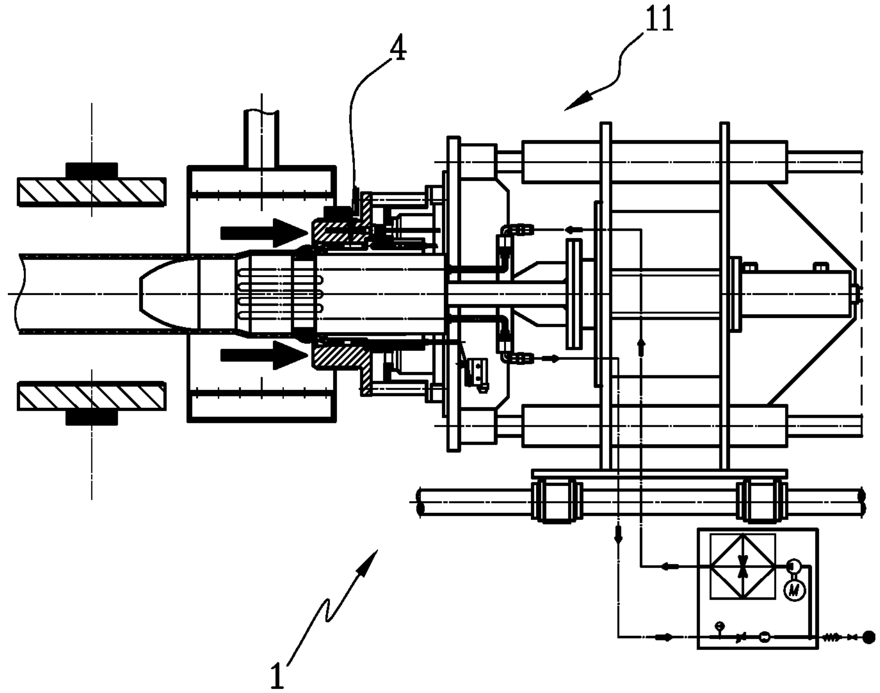
Figure 16:
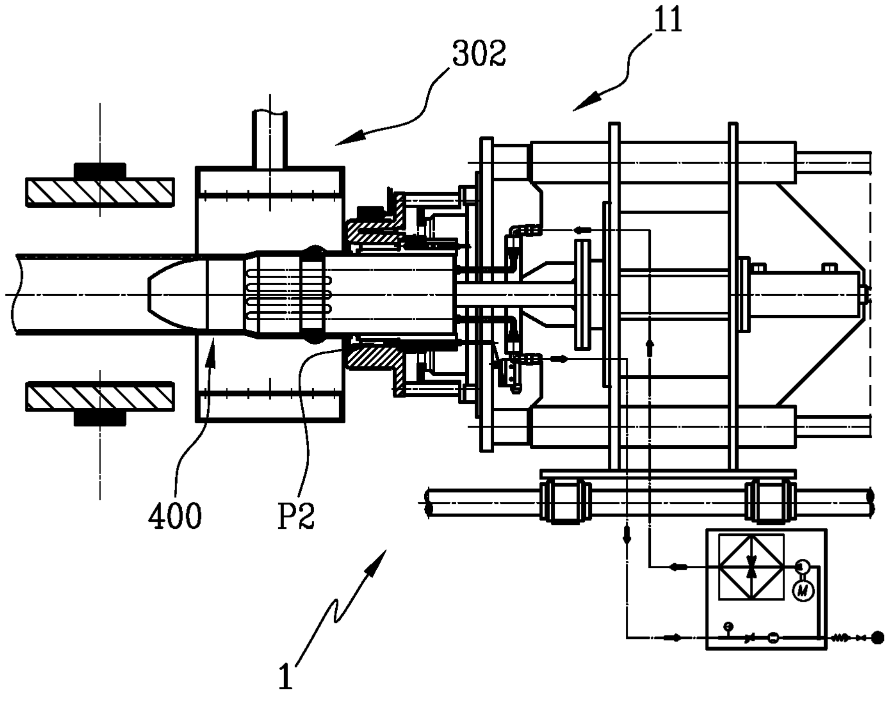

FIG. 15 illustrates the continuation of the step of extending the bell.

During this step, the clamp 10 is in the open configuration, the carriage 11 in the close position P4 and the annular contact element 4 starts the movement from the advanced position P1 towards the withdrawn position P2.

Starting from the step of inserting the pipe 400 in the gasket 200, until the end of the extension step, the first heating device 6 is activated, for heating the inside of the pipe and, simultaneously, the second heating device 5 is activated, for heating from the outside the pipe 400 made of thermoplastic material. Both the heating devices (5, 6) contribute to heating the end portion E1 of the pipe 100 which extends from the seat 111 of the gasket 200 to the first end 102 of the pipe 100.

Figure 17:
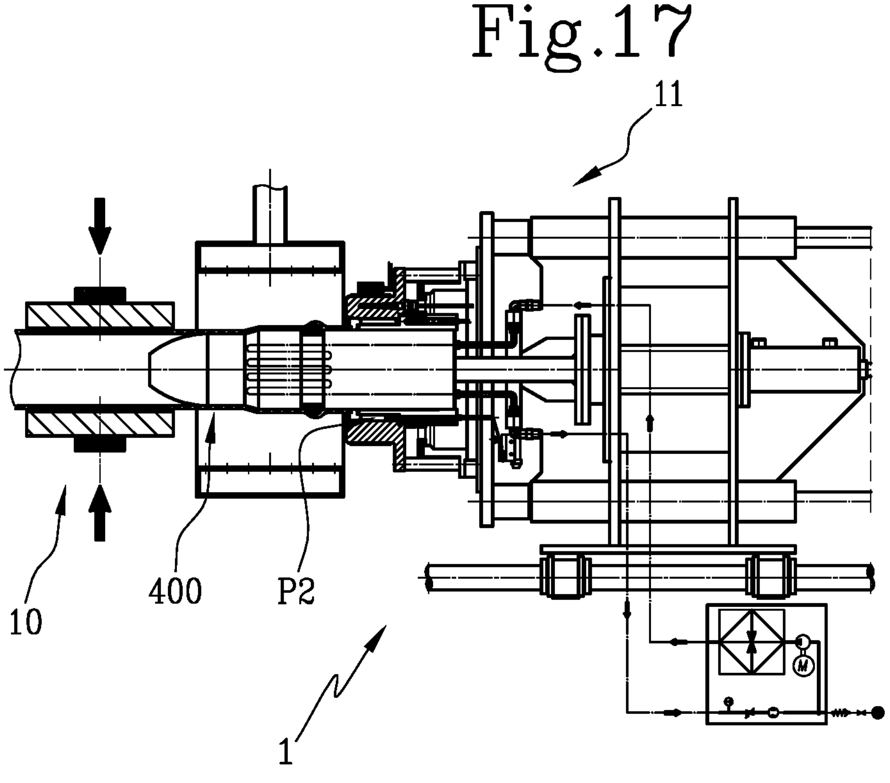

FIG. 17 illustrates the end of the step of extending the bell.

During this step, the clamp 10 is in the closed configuration.

Figure 18:
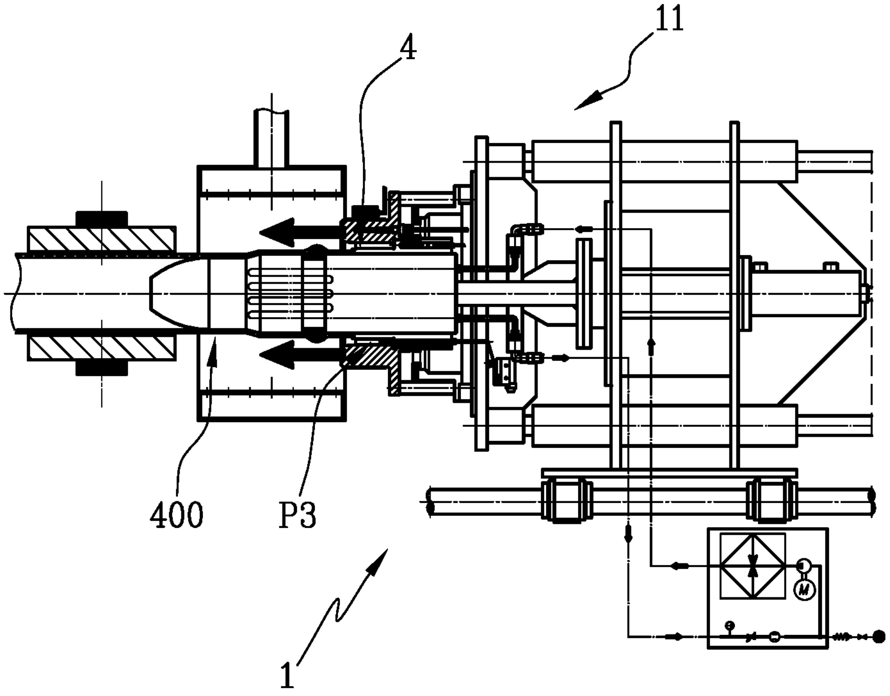

FIG. 18 illustrates the step wherein the annular contact element 4 is moved towards the pipe 400 (towards the advanced position P1), that is to say, it is moved to an intermediate position P3 (between the advanced position P1 and the withdrawn position P2) in which it engages with the edge of the bell of the pipe 400.

In this way, the annular contact element 4 strikes and compresses the edge of the bell.

The annular contact element 4 is kept in this intermediate position for engaging with the edge of the pipe 400 for a predetermined time, to allow an elastic relaxation of the gasket 200 and the fitting of the edge of the pipe 400.

This step defines an elastic relaxation of the gasket 200 and the fitting of the edge of the pipe 400.

Figure 19:
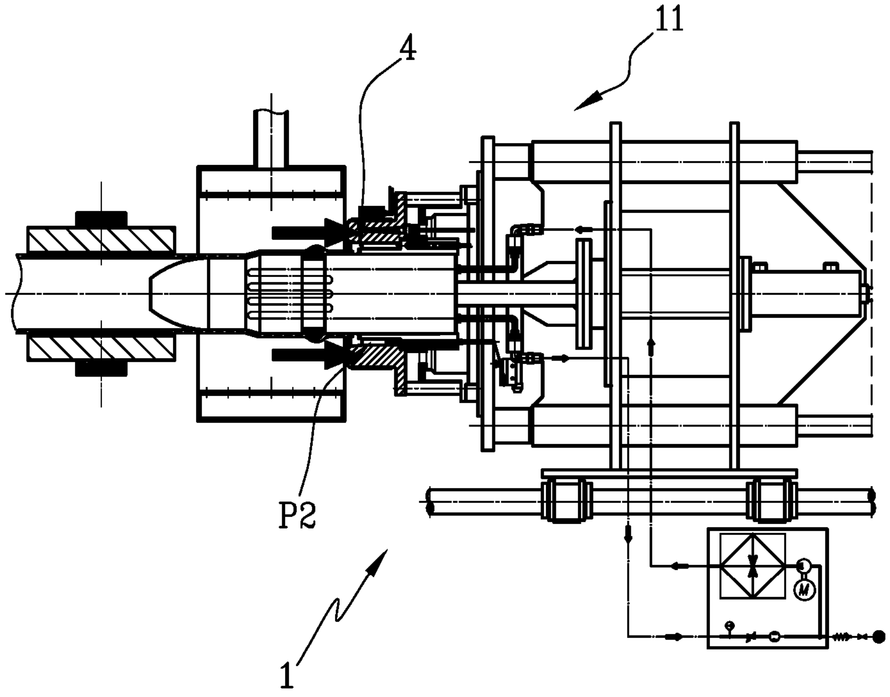

FIG. 19 illustrates the end of elastic relaxation of the gasket 200 and the fitting of the edge of the pipe 400.

The annular contact element 4 is moved away from the pipe 400, towards the withdrawn position P2.

Figure 20:
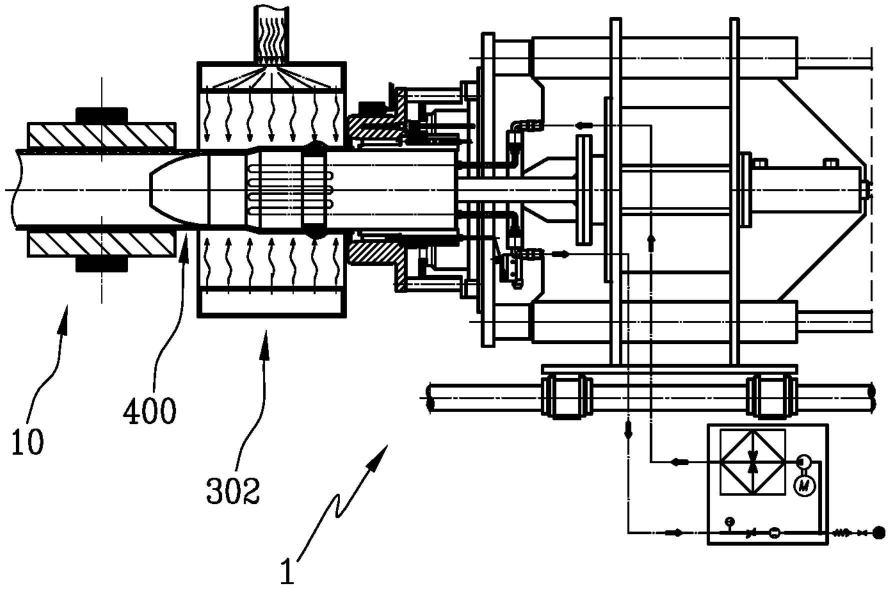

FIG. 20 illustrates the annular contact element 4 in the withdrawn position P2 of disengagement (it does not engage in any way the gasket 200 and/or the pipe 400).

The bell is still hot and, during this step the cooling (using the cooling unit 302) of the first end E1 of the pipe 400 starts.

Figure 21:
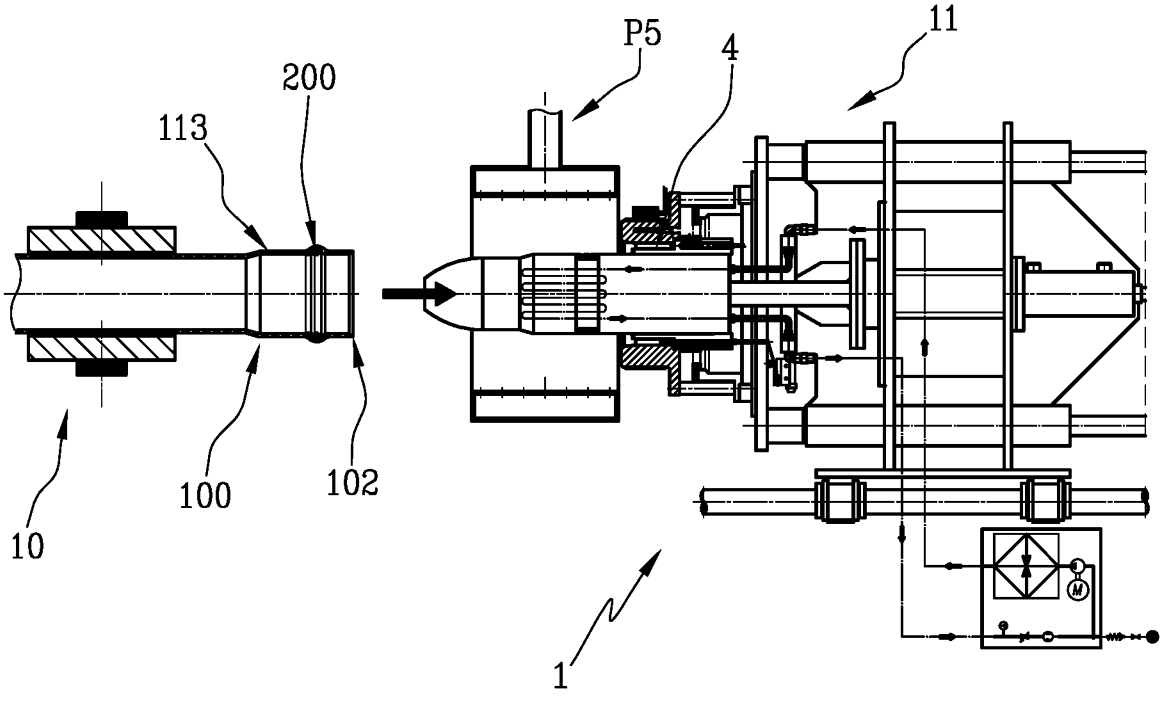

FIG. 21 illustrates the bell 113 of the pipe 100 made, with the clamps 10 still closed. During this step, the carriage 11 is moved towards the far position P5, for disengaging the pad 2 from the pipe 100.

Figure 22:
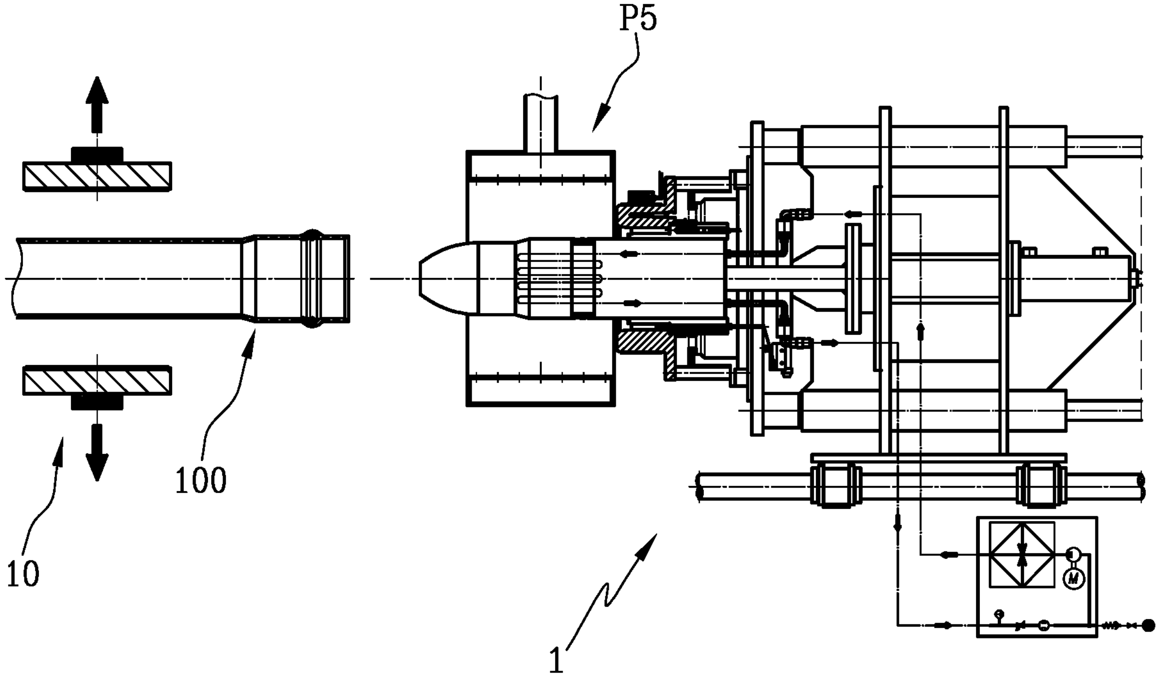
Figure 23:
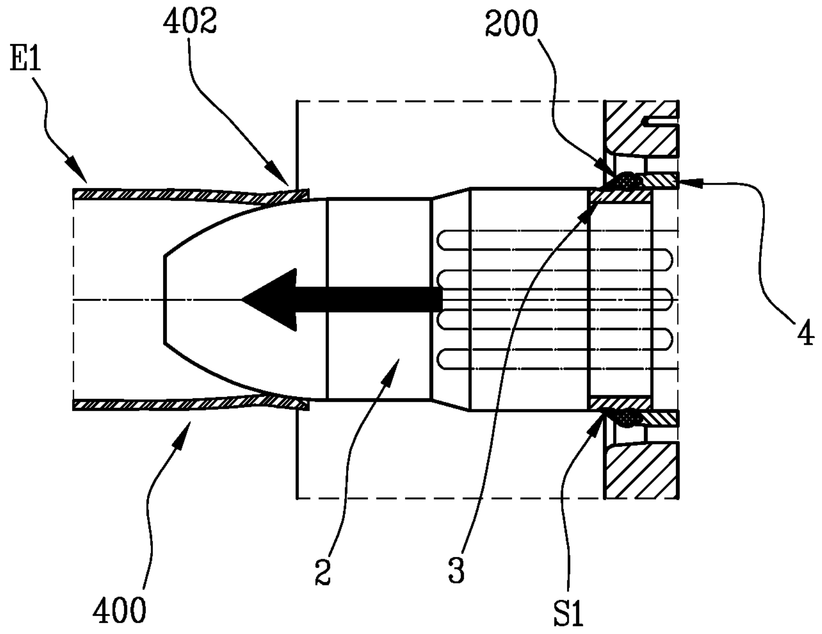
FIGS. 23 to 33 illustrate further details of the forming of the bell of the pipe according to the invention.
Figure 24:
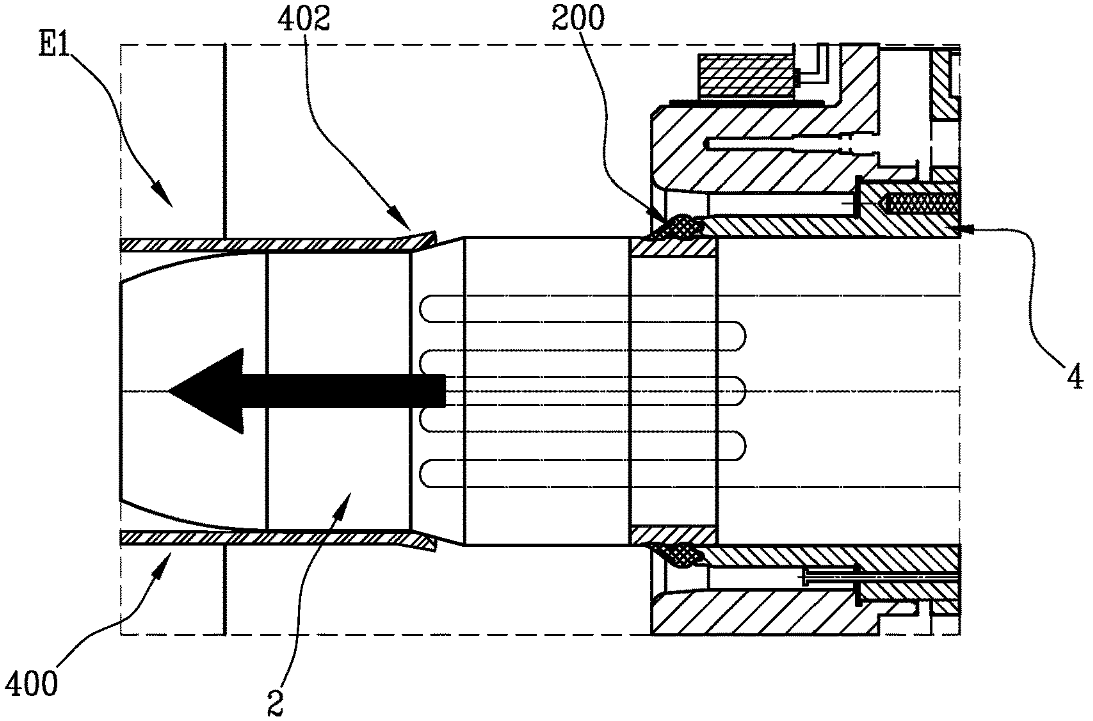
Figure 25:
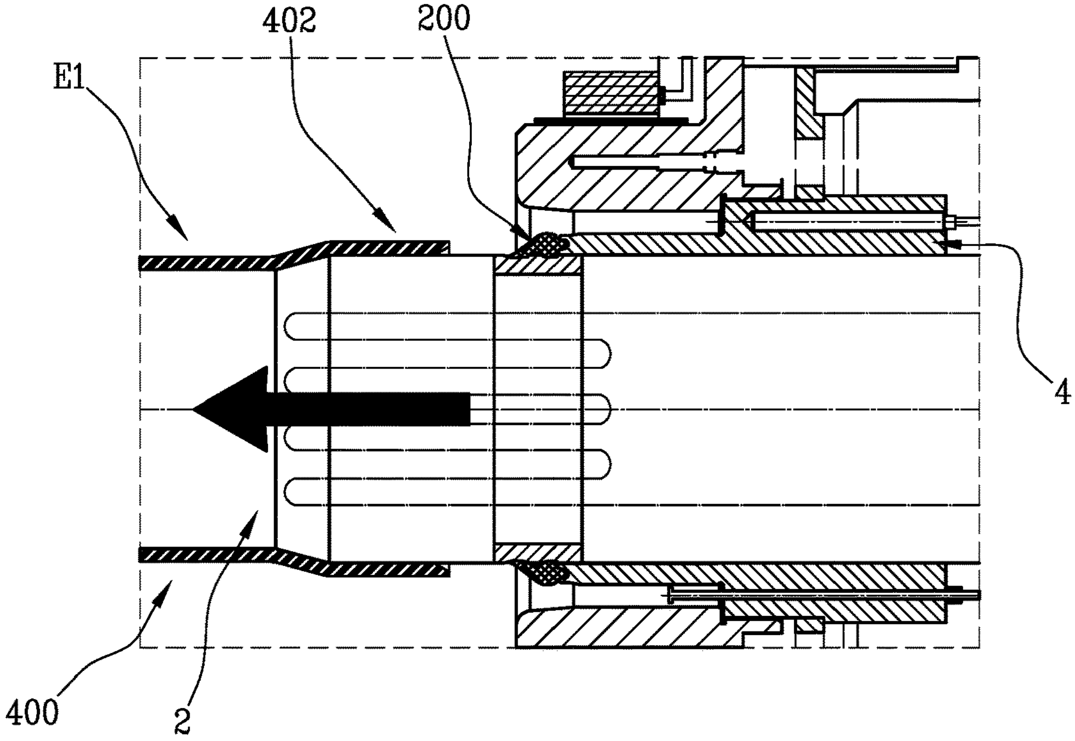

FIG. 22 illustrates the clamp 10 in the open configuration. During this step, the pipe 100 (with the bell 113 made and the gasket 200 inserted inside the pipe) is extracted from the unit 1.

FIGS. 23 to 33 illustrate, with greater precision in detail (in terms of time), what occurs during the process for forming the bell of the pipe 100 according to the invention.

Figure 30:
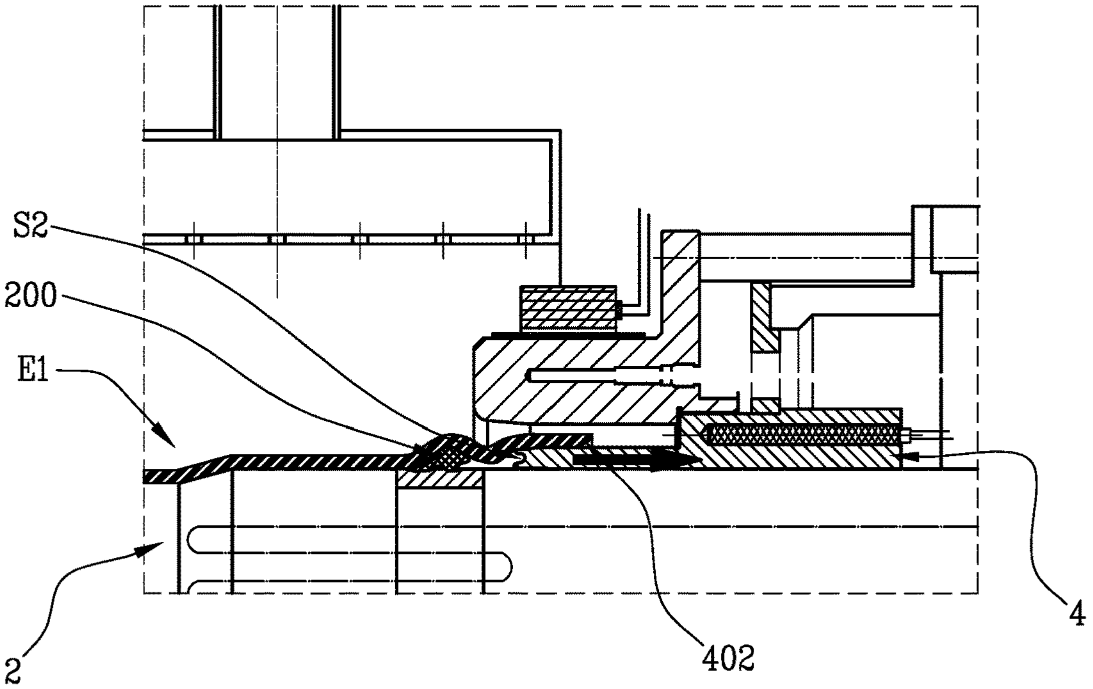
Figure 31:
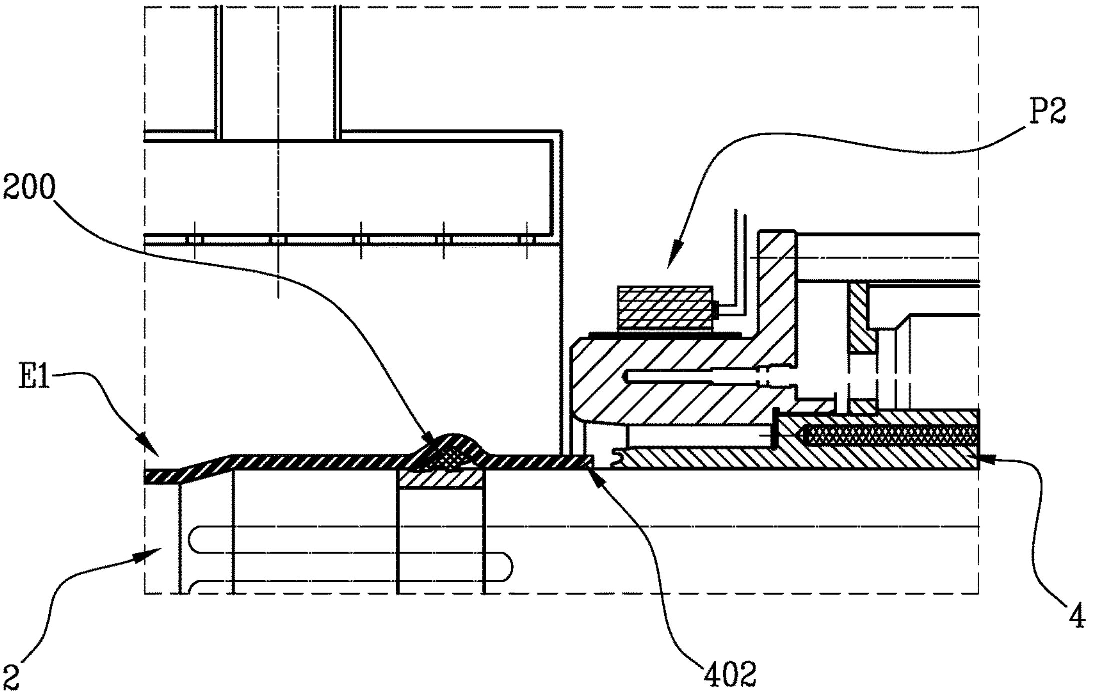

In FIGS. 23 to 29 the carriage 11 is moved towards the pipe 400; in FIG. 30 the annular element 4 is moved towards the withdrawn position P2.

Figure 26:
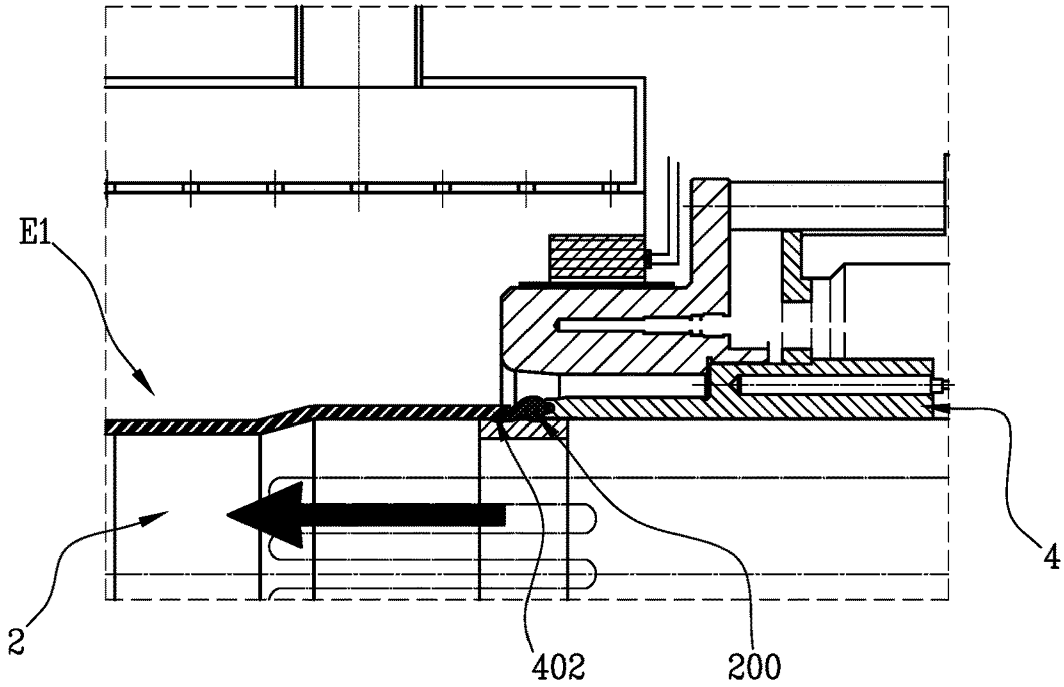
Figure 27:
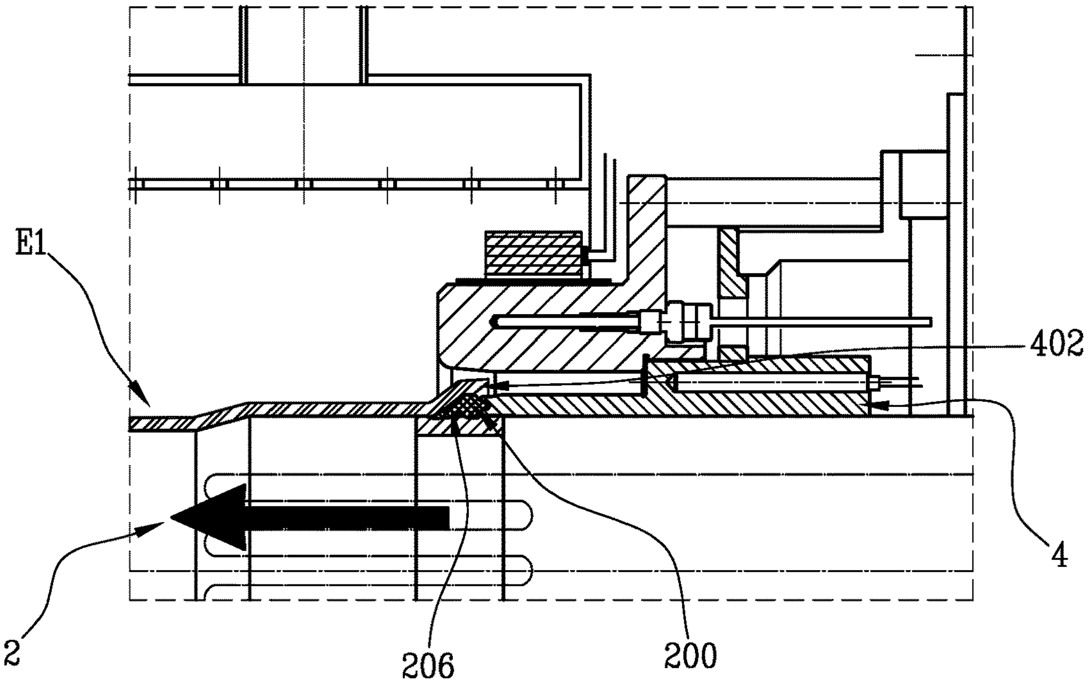
Figure 28:
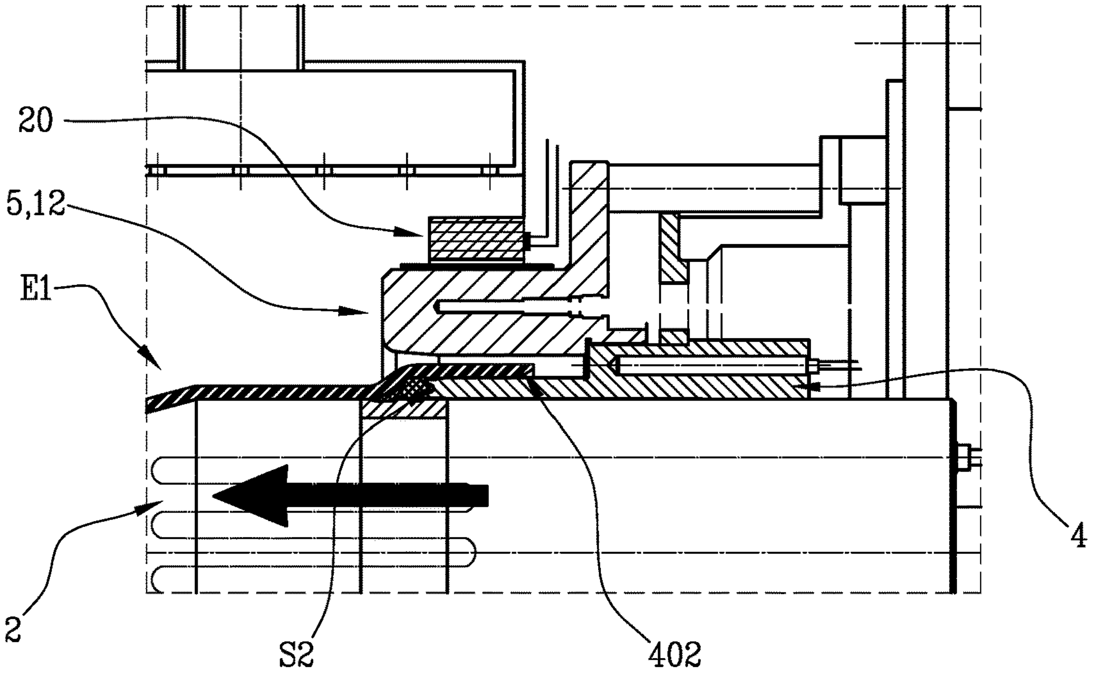
Figure 29:
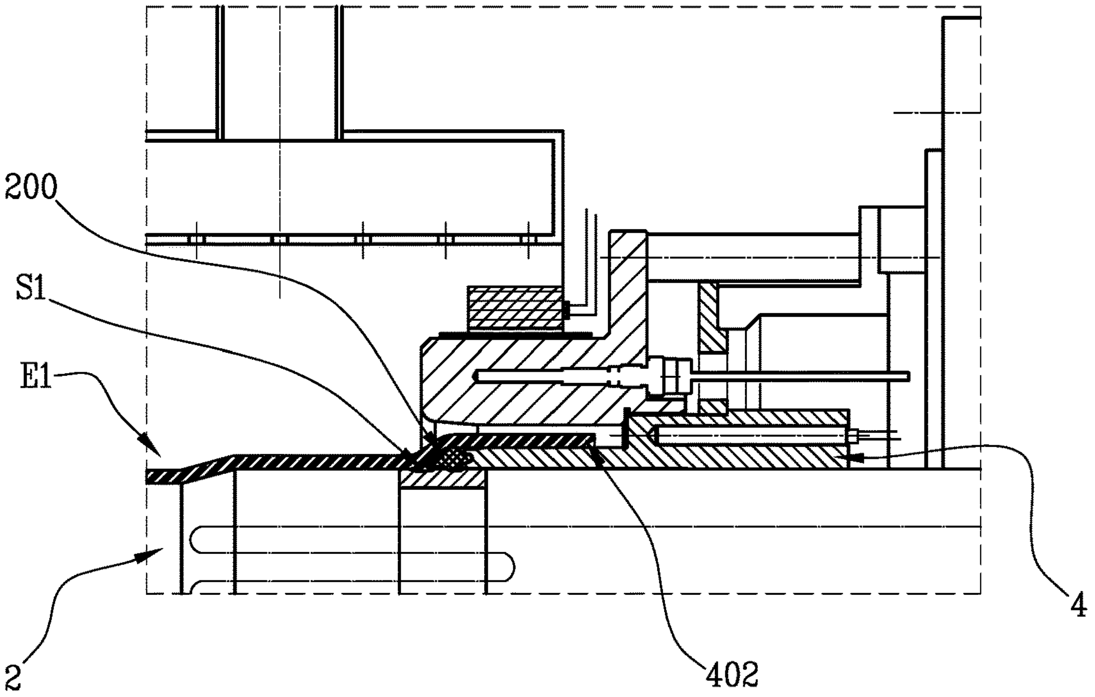

As shown in FIG. 26, the first impact of the end edge of the pipe against the shoulder of the gasket occurs with the surface of the end edge of the flared pipe according to a taper angle αp comparable to the angle θp of inclination of the shoulder 203 of the gasket 200.

Figure 32:
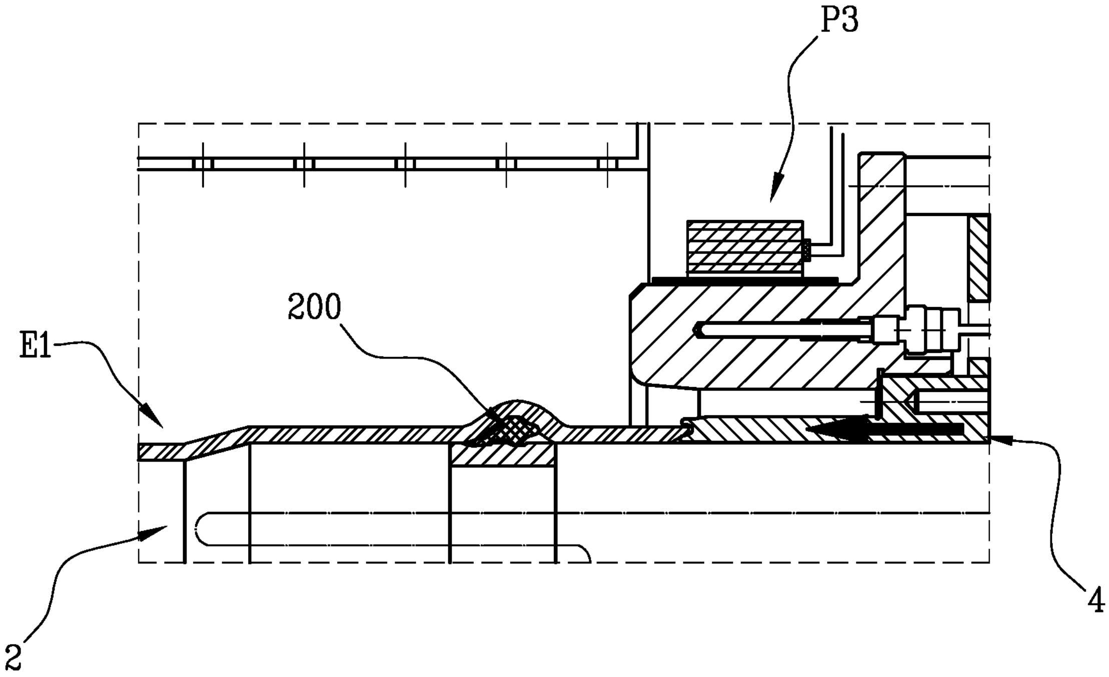
Figure 33:
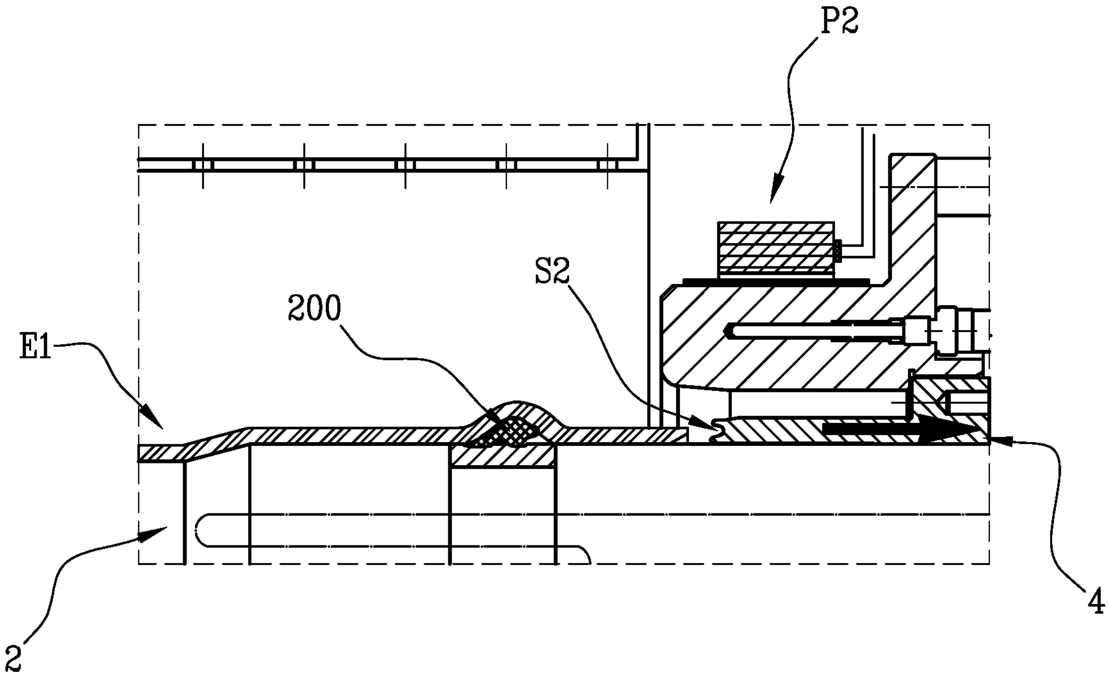

In FIG. 32 the annular element 4 is moved towards the close position P1, more specifically until reaching a predetermined intermediate contact position P3 with the edge of the pipe 400 (prior to being moved again towards the withdrawn position P2.

It should be noted that, according to the method described and the unit 1 described above, the gasket 200 is locked permanently inside the pipe 100 (for the shape coupling and for the bond between the materials of the pipe 100 and the gasket 200 which are established during the processing).

With the machine and the method described, and according to the accompanying claims, in particular with the prior embodiment, before the heating process, of the inner taper 412 of the first end 402 of the pipe 400, an evident reduction in the axial compression stresses is obtained in the wall of the first end portion E1 designed to define the bell 113 of the finished pipe 100.

Internal actions which are generated during the entire step of inserting the pipe 400 in the gasket 200 which cancel out or reduce considerably in the first end portion E1 designed to define the bell 113 of the finished pipe 100 the degree of original axial orientation of the PVC-O pipe.

The presence of these stresses is highlighted and correlates with the increase in thickness of wall in the bell 113 of the finished pipe 100 relative to the thickness of the wall of the pipe 400 not formed in the form of a bell.

Indeed, this thickening is basically a permanent deformation generated by axial compression loads.

In fact, according to the invention, during the entire step of inserting the pipe 400 in the gasket 200 the maintaining of the shape of the gasket 200 installed in the pad 2 is substantially obtained, so the resistance which axially contrasts the wall of the pipe which generates its thickening is not accentuated and, consequently, the capacity of resistance to the hydrostatic pressure of the bell 113 is not adversely affected.

Indirectly, the belling unit 1 according to the invention, which is already advantageous for achieving the correct shape of the final part of the bell 113, that is to say, the locking of the gasket 200 in the wall of the bell 113, also contributes to limiting the phenomenon of generation of axial compression stresses which adversely affect the degree of orientation of the material in the bell 113.

In effect, the unit 1 designed for shaping perfectly the final part of the bell 113 on the gasket 200 makes it possible to limit the state of heating of the pipe necessary to start and complete the process for shaping the bell.

The colder pipe is elastically more rigid and less subject to undergo permanent plastic deformations of axial compression during insertion of the pipe 400 in the pad 2, in the gasket 200 and in the flange 4.

Advantageously, the belling unit 1 and the method described, and according to the appended claims, allow a bell to be obtained in a PVC-O pipe, according to the RIEBER method, even with considerable thicknesses of walls.

The belling unit 1 and the method are extremely efficient, and allow a bell to be made in a PVC-O pipe of very high quality (both as regards the dimensional and constructional features of the bell, and with regard to the coupling between the gasket and the pipe and the relative gasket during coupling of the pipe with other pipes).

Moreover, it is possible to make a PVC-O pipe suitable for operating pressures of 25 bar up to diameters of 630 mm.

The invention claimed is:

1. A method comprising the following steps:

a step of feeding a pipe into a receiving station for receiving the pipe;

a step of heating a first end portion of the pipe, in a heating station;

a step of belling the first end portion of the pipe, after the step of heating the first end portion of the pipe;

a step of making an inner taper at the first end portion of the pipe by material removal or plastic deformation, in a tapering station separate from the heating, said making the inner taper being performed before the heating step.

2. The method according to claim 1, and further comprising a step of preheating the first end portion of the pipe after the tapering step and before the belling step.

3. The method according to claim 1, and further comprising a step of forming a chamfer at an outer surface of a second end portion of the pipe in a chamfering station.

4. The method according to claim 1, wherein the belling step comprises the following steps:

preparing a forming pad configured to deform into a bell shape the first end portion of the pipe;

preparing an annular contact element, fitted on said forming pad, and movable along said forming pad between an advanced position, and a withdrawn position;

preparing an annular gasket on said forming pad in a predetermined region, said annular gasket being designed to be stably located in the bell to be formed, positioning said annular contact element in the advanced position to make contact with the annular gasket;

preparing the pipe having the first end portion heated to a predetermined temperature configured to allow the deformation, wherein the predetermined temperature is higher than a vitreous transition temperature;

moving, up to a predetermined distance, relative to each other said first end portion of the pipe and said forming pad, towards each other in a direction of a longitudinal central axis of the pipe, for fitting said first end portion on the assembly of said forming pad and said annular gasket and said annular contact element, heating the annular contact element to a predetermined temperature to heat by contact an inner surface of the first end portion of the pipe surrounding the annular contact element and, simultaneously, heating from an outside said pipe fitted on the forming pad, at the first end portion of the pipe.

5. The method according to claim 4, wherein the forming pad includes a first housing seat for housing the annular gasket, facing radially towards an outside of the forming pad, and wherein the step of preparing the annular gasket on said forming pad comprises a step of inserting at least a portion of the annular gasket inside the first housing seat.

6. The method according to claim 4, wherein the annular contact element includes a second housing seat for housing a portion of the annular gasket and wherein the step of preparing the annular gasket on said forming pad comprises a step of receiving at least a portion of the annular gasket inside the second housing seat.

7. The method according to claim 4, wherein the step of heating from the outside said pipe fitted on the forming pad comprises a step of preparing an annular heating element having an inner surface surrounding the first end portion of the pipe and spaced, radially, from an outer surface of the pipe by a distance of between 1 mm and 10 mm.

8. The method according to claim 4, and further comprising, at least during the step of heating the annular contact element to the predetermined temperature and, simultaneously, heating from the outside said pipe fitted on the forming pad, a step of closing the pipe using a clamp, and a step of releasing the pipe by opening the clamp for a predetermined time, after the steps of:

moving, up to a predetermined distance, relative to each other said first end portion of the pipe and said forming pad, towards each other in a direction of a longitudinal central axis of the pipe positioning said annular contact element in the advanced position, for making contact with the pipe and the annular gasket of the pipe.

9. The method according to claim 8, wherein the step of releasing the pipe by opening the clamp is performed before, or partly superposing on, a step of moving said annular contact element from the advanced position to the withdrawn position, to release from the annular gasket and from the pipe.

10. The method according to claim 8, and further comprising, after the step of releasing the pipe by opening the clamp, a step of further clamping the pipe by closing the clamp.

11. The method according to claim 4, and further comprising, after the step of heating the annular contact element to the predetermined temperature to heat by contact the inner surface of the first end portion of the pipe surrounding the annular contact element and, simultaneously, heating from the outside said pipe fitted on the forming pad, at the first end portion of the pipe, a step of moving the annular contact element from the advanced position to the withdrawn position, to release from the pipe, and a subsequent step of moving the annular contact element from the withdrawn position towards the advanced position, up to an intermediate position for engaging the annular contact element with a first end of the pipe, for compressing the first end of the pipe.

12. The method according to claim 11, wherein during the step of belling the first end portion, at a moment of first contact between the first end of the pipe and a first portion of the annular gasket installed on the forming pad, a taper angle is defined of the inner taper of the first end of the pipe and a longitudinal extension of the inner taper of the first end of the pipe when the annular gasket strikes the first end of the pipe with the first portion of the annular gasket installed on the forming pad;

wherein a value of the taper angle of the inner taper is equal to a value of an acute angle of inclination of the first portion of the annular gasket±10°; an extension of the first portion of the annular gasket being greater than the longitudinal extension of the inner taper.

13. The method according to claim 12, wherein the taper angle of the inner taper of the first end of the pipe formed before the process for heating the pipe is proportional to the taper angle of the inner taper of the first end of the pipe at the moment of first contact between the first end of the pipe and the first portion of the annular gasket installed on the forming pad;

wherein the longitudinal extension of the inner taper of the first end of the pipe formed before the heating process is proportional to the longitudinal extension of the inner taper of the first end of the pipe at the moment of impact of the first end of the pipe with the first portion of the annular gasket installed on the forming pad.

14. The method according to claim 12, wherein the taper angle of the inner taper of the first end of the finished pipe is proportional to the taper angle of the inner taper of the first end of the pipe at the moment of first contact between the first end of the pipe and the first portion of the annular gasket installed on the forming pad; wherein the longitudinal extension of the inner taper of the first end of the finished pipe is proportional to the longitudinal extension of the inner taper of the first end of the pipe at the moment of impact of the first end of the pipe with the first portion of the annular gasket installed on the forming pad.

* * * * *